United States Patent
Aoki

(10) Patent No.: US 7,662,473 B2
(45) Date of Patent: Feb. 16, 2010

(54) AMORPHOUS INORGANIC CERAMIC MATERIAL AND METHOD OF PRODUCING SAME

(75) Inventor: Yoshitaka Aoki, Takasaki (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 153 days.

(21) Appl. No.: 11/896,445

(22) Filed: Aug. 31, 2007

(65) Prior Publication Data

US 2008/0057817 A1 Mar. 6, 2008

(30) Foreign Application Priority Data

| Sep. 1, 2006 | (JP) | ............................. 2006-238187 |
| Sep. 1, 2006 | (JP) | ............................. 2006-238312 |
| Sep. 1, 2006 | (JP) | ............................. 2006-238317 |

(51) Int. Cl.
- B32B 9/00 (2006.01)
- D02G 3/00 (2006.01)
- D04H 1/00 (2006.01)
- D04H 13/00 (2006.01)

(52) U.S. Cl. ........................ 428/367; 428/364; 442/327; 442/335

(58) Field of Classification Search .................. 442/327, 442/335, 353; 428/364, 367
See application file for complete search history.

(56) References Cited

U.S. PATENT DOCUMENTS

| 5,908,480 A | 6/1999 | Ban et al. |
| 2007/0161256 A1 | 7/2007 | Gates et al. |

FOREIGN PATENT DOCUMENTS

| EP | 0 332 374 A1 * | 6/1989 |
| EP | 0 435 065 A1 | 11/1990 |
| JP | 6-92753 A | 4/1994 |
| JP | 7-18520 A | 1/1995 |
| JP | 2004-60096 A | 2/2004 |
| JP | 2004-360115 A | 12/2004 |

OTHER PUBLICATIONS

Ye et al: Thin Solid Films, Elsevier-Sequoia S.A. Lausanne, CH, vol. 496, No. 2, Feb. 21, 2006, pp. 221-226.
Ye et al: Microelectronic Engineering, Elsevier vol. 82, No. 1, Sep. 1, 2005, pp. 35-43.
Grill A et al: Advanced Metallization Confrence. Proceedings of the Confrence, 2001, pp. 253-259.
Cui Hao et al: Journal of Applied Physics, American Institute of Physics. New York, US, vol. 97, No. 11, May 25, 2005, pp. 113302-113302.

* cited by examiner

*Primary Examiner*—Lynda Salvatore
(74) *Attorney, Agent, or Firm*—Birch, Stewart, Kolasch & Birch, LLP

(57) ABSTRACT

An amorphous inorganic ceramic material including silicon, carbon and oxygen is provided. In the ceramic material, the average elemental ratio between silicon, carbon and oxygen is represented by a compositional formula:

$$SiC_aO_b$$

wherein, a is a number that satisfies: $0.5 \leq a \leq 3.0$, and b is a number that satisfies $0.5 \leq b \leq 4.0$), the material has a siloxane skeleton formed of Si—O—Si bonds, and the hydrogen mass fraction is within a range from 0 to 1% by mass. The material exhibits excellent heat resistance, wettability with other materials, strength and elastic modulus, and is useful as a reinforcing material for composite materials, or as an exhaust gas filter material or the like.

24 Claims, 6 Drawing Sheets

Before Heat Treatment

After Heat Treatment

AMORPHOUS INORGANIC CERAMIC MATERIAL AND METHOD OF PRODUCING SAME

BACKGROUND OF THE INVENTION

1. Field of the Invention

The present invention relates to a novel amorphous inorganic ceramic material that exhibits excellent heat resistance and the like, and a method of producing such a material, as well as an inorganic fiber and an inorganic nonwoven fabric comprising the ceramic material, and methods of producing the fiber and fabric. Moreover, the present invention also relates to a composite material that comprises the inorganic fiber or inorganic nonwoven fabric as a reinforcing material.

2. Description of the Prior Art

Conventionally, glass fiber and carbon fiber are the most widely known reinforcing materials for composite materials. In particular, carbon fiber reinforced plastic (CFRP) exhibits superior levels of strength and elastic modulus to steel or glass fiber reinforced plastic (GFRP), and also offers superior mechanical properties.

However, in recent years, as a result of the demands to reduce the consumption of crude oil due to factors such as global warming caused by carbon dioxide and the sharp rise in the cost of crude oil, reductions in the weight of all manner of components is becoming necessary. If the quantity of CFRP or the like is reduced in order to meet these demands for weight reduction, then the strength of the resulting product tends to be unsatisfactory. In this manner, these reinforcing materials are unable to satisfy all the required properties.

Composite materials of carbon fiber and a light metal such as aluminum have been investigated as potential improvements to the situation described above, but the wetting properties of carbon fiber and a light metal are poor, and the light metal and carbon may undergo reaction at high temperatures, causing a deterioration in the strength.

On the other hand, the silicon-based fiber developed by Yajima et al. in 1975 exhibits favorable wetting with light metals, good heat resistance, and does not suffer from the problem of reaction between the light metal and the fiber at high temperatures causing a deterioration in the strength. Furthermore, methods in which a polycrystalline silicon carbide fiber is produced from an organopolysiloxane are also being investigated. However, a high temperature treatment of at least 1,600° C. is required to produce these types of fibers, and moreover, because these fibers contain phenyl groups, the Si/C elemental ratio is low, and the carbon loss ratio during heat treatment is high, meaning they face problems in terms of conserving resources, and from an economic perspective.

In recent years, methods have been proposed for preparing ultra fine silicon-based fibers by conducting fiber spinning of polymer blends. In these methods, two raw materials are used, namely a polycarbosilane that functions as a silicon precursor to the silicon-based fiber, and a resin that disappears by thermal decomposition as a matrix. Specifically, the silicon precursor is dispersed and mixed within the resin that disappears upon thermal decomposition, melt spinning is then conducted, and a heat treatment is then conducted. In the methods that use these raw materials, large quantities of hydrogen are generated during the production process, meaning safety can be problematic (patent references 1 and 2).

A method has also been proposed in which carbon fiber is reacted with silicon monoxide gas to generate silicon carbide fibers, and the resulting fibers are then subjected to heat treatment. This method requires a gaseous phase reaction to be conducted under conditions of reduced pressure and high temperature, meaning a simpler method would be more desirable (patent reference 3).

Exhaust gases discharged from vehicles and industrial machinery and the like cause atmospheric pollution, and are attracting considerable attention. Particularly in the case of diesel engine vehicles, the removal of NOx and suspended particulate matter comprised mainly of carbon is a significant issue.

Against this type of background, a large variety of different exhaust gas purification devices have been proposed. A typical exhaust gas purification device for a diesel engine is a structure in which a casing is provided partway along the exhaust pipe connected to the engine exhaust manifold, and a filter having very fine apertures formed therein is then disposed within this casing, but the material for this filter suffers from cracking caused by temperature fluctuations and dissolution loss (patent reference 4). In order to overcome these problems, exhaust gas purification devices that use either a metallic nonwoven fabric (patent reference 5) or a silicon carbide-based nonwoven fabric (patent reference 6) as the filter have also been proposed. However, because these materials are short fibers, the material strength tends to be low, and the methods are also extremely expensive due to raw material synthesis problems that require the synthesis of a polysilane from dimethyldichlorosilane, followed by the synthesis of a polycarbosilane or polytitanocarbosilane.

[Patent Reference 1] EP 0435065 A1
[Patent Reference 2] JP 2004-360115 A
[Patent Reference 3] JP 7-18520 A
[Patent Reference 4] JP 6-92753 A
[Patent Reference 5] U.S. Pat. No. 5,908,480
[Patent Reference 6] JP 2004-60096 A

SUMMARY OF THE INVENTION

Accordingly, an object of the present invention is to provide a material that exhibits excellent levels of heat resistance, wettability with other materials, strength and elastic modulus, which is capable of adopting a variety of different forms, including molded items of various shapes such as fibers, and nonwoven fabrics, and is useful as a reinforcing material for composite materials or an exhaust gas filter material or the like, and also to provide a method of producing such a material.

As a result of intensive investigation aimed at achieving the above object, the inventors of the present invention discovered that a silicon-carbon-oxygen based ceramic material obtained by heating and calcining a solid silicone under a non-oxidizing atmosphere was able to achieve the above object, and they were therefore able to complete the present invention.

Thus, a first aspect of the present invention provides an amorphous inorganic ceramic material comprising silicon, carbon and oxygen, wherein the average elemental ratio between silicon, carbon and oxygen is represented by a compositional formula (1) shown below:

$$SiC_aO_b \qquad (1)$$

(wherein, a is a number that satisfies: $0.5 \leq a \leq 3.0$, and b is a number that satisfies $0.5 \leq b \leq 4.0$), the material has a siloxane skeleton formed of Si—O—Si bonds, and the hydrogen mass fraction is within a range from 0 to 1% by mass. This ceramic material can also be provided, for example, in fibrous form or in the form of a nonwoven fabric. This inorganic ceramic material can be obtained, for example, using the production method described below.

A second aspect of the present invention is a method of producing the above amorphous inorganic ceramic material, comprising heating a non-melting solid silicone under a non-oxidizing atmosphere at a temperature within a range from 400 to 1,500° C. In this production method, preferred examples of the non-melting solid silicone used as the starting raw material include non-melting silicone resins and the cured products of curable silicone compositions.

The above amorphous inorganic ceramic material of the present invention is useful as the material for all manner of products, and for example, can be used as a reinforcing material for plastic materials or metal materials.

Accordingly, a third aspect of the present invention provides a composite material, comprising either one of, or both, a metal material and a polymer material, as well as the above amorphous inorganic ceramic material as a reinforcing material. In this case, the amorphous inorganic ceramic material is preferably in the form of a fiber or nonwoven fabric described above.

Furthermore, in a nonwoven fabric form, the ceramic material is also useful as an exhaust gas filter material.

In other words, a fourth aspect of the present invention provides an exhaust gas filter comprising the above inorganic nonwoven fabric. This filter is useful for removing the suspended particulate matter incorporated within an exhaust gas, and can be used within an exhaust gas device. For example, the exhaust gas filter can be used for the purification of exhaust gases discharged from large vehicles such as trucks and buses, railway cars such as diesel locomotives, industrial machines that use diesel engines such as construction machinery, agricultural machinery and ships and the like, as well as exhaust gases from factories and domestic fuel cells.

Because the amorphous inorganic ceramic material of the present invention exhibits excellent levels of heat resistance, wettability, strength and elastic modulus, it can be formed in a variety of different configurations, and can therefore be used in all manner of applications. Because of these superior properties, fibers or nonwoven fabrics comprising the ceramic material can be used particularly favorably as reinforcing materials for composite materials that employ a metal material or plastic material as the base.

Furthermore, this amorphous inorganic ceramic material can also be used for a variety of molded items, as well as for patterned molded items having dielectric properties, insulating properties or conductive properties, and for coating materials that impart heat resistance to wiring materials or fibers comprising an inorganic material such as glass or carbon fiber.

The nonwoven fabric-type amorphous inorganic ceramic material of the present invention exhibits excellent heat resistance and strength, and can consequently be used favorably as a material for gas filters that are exposed to high temperatures, and particularly as a material for exhaust gas filters used for removing the suspended particulate matter incorporated within the exhaust gas from diesel engines and the like.

Furthermore, according to the production method of the present invention, the above amorphous inorganic ceramic materials can be produced with good suppression of wasteful consumption of resources.

DETAILED DESCRIPTION OF THE PREFERRED EMBODIMENTS

Figure 1:
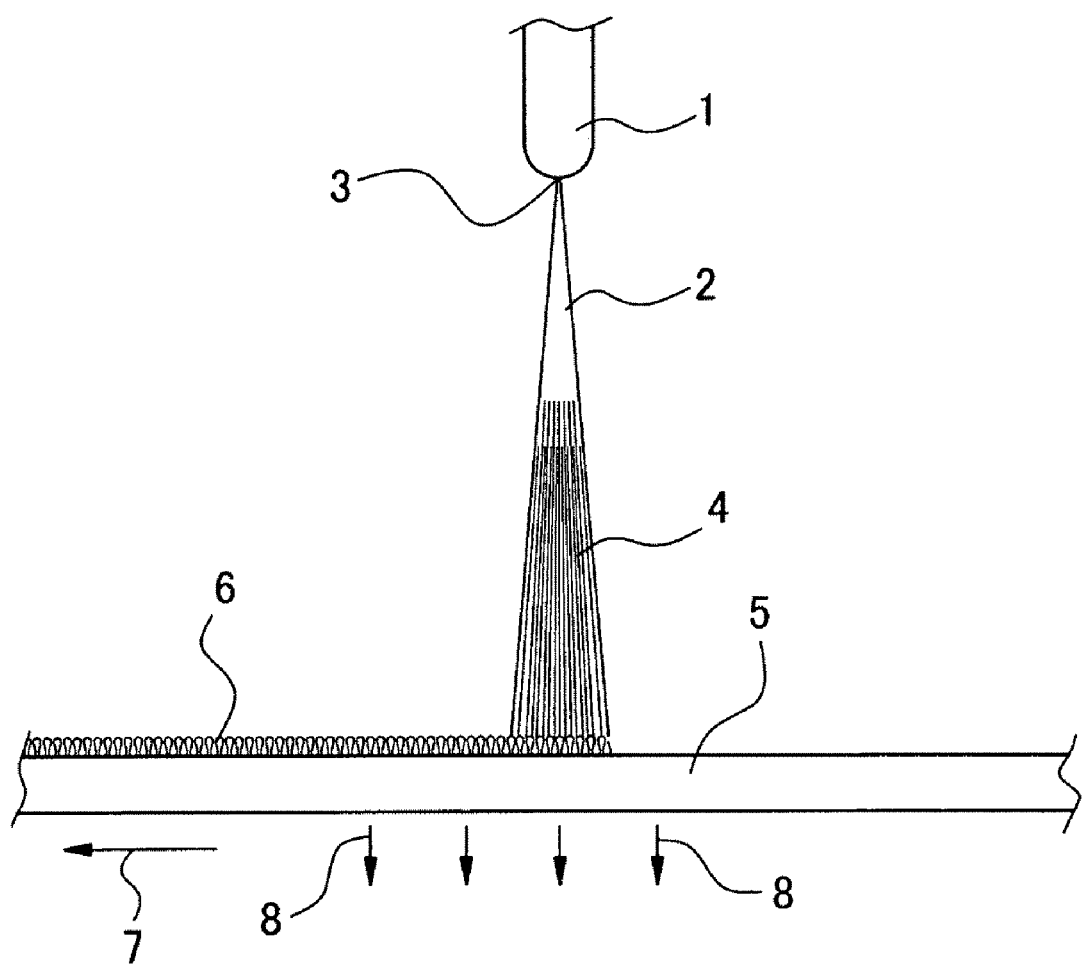
FIG. 1 is a schematic diagram describing a process for producing a silicone-based nonwoven fabric from a silicone resin using a dry method.

As follows is a more detailed description of the present invention.

In this specification, the term "solid silicone" refers to a silicone that is solid at room temperature. A silicone is a polymer material with an organopolysiloxane base, and in some cases, may exist in the form of a composition that also includes other components such as a filler. Unless stated otherwise, room temperature refers to a temperature within a range from 15 to 35° C.

The term "silicone resin" refers to an organopolysiloxane having a three dimensional structure which comprises branched siloxane units (namely, trifunctional siloxane units known as T units and/or tetrafunctional siloxane units known as Q units) as essential siloxane units. In some cases, the silicone resin may also include straight-chain siloxane units known as D units and/or monofunctional siloxane units known as M units that are positioned at molecular chain terminals.

Furthermore, in this specification, a polymer material described as "non-melting" has no softening point, meaning that as the temperature is raised for a non-melting polymer material, the material does not melt, but rather undergoes thermal decomposition. Accordingly, a "non-melting solid silicone" refers to a solid silicone that has no softening point, and a "non-melting silicone resin" refers to a silicone resin that has no softening point. The temperature at which non-melting solid silicones undergo thermal decomposition typically exceeds a temperature of approximately 400° C.

In this specification, the "softening point" refers to a temperature measured in accordance with the softening point test method (ring and ball method) prescribed in JIS K 2207.

[Amorphous Inorganic Ceramic Material]

An amorphous inorganic ceramic material of the present invention (hereafter also referred to as simply "the ceramic material") is as described above, namely, is an amorphous inorganic ceramic material comprising silicon, carbon and oxygen, which has a siloxane skeleton formed of Si—O—Si bonds, wherein the average elemental ratio between silicon, carbon and oxygen is represented by a compositional formula (1) shown below:

$$SiC_aO_b \quad (1)$$

(wherein, a is a number that satisfies: $0.5 \leq a \leq 3.0$, and b is a number that satisfies $0.5 \leq b \leq 4.0$), and the hydrogen mass fraction is within a range from 0 to 1% by mass. In the above description, a is preferably 0.8 or greater, and more preferably 1.0 or greater, and a is preferably 2.0 or smaller, and more preferably 1.5 or smaller; b is preferably 1.0 or greater, and more preferably 1.2 or greater, and b is preferably 3.0 or smaller, and more preferably 2.0 or smaller. Furthermore, a+b is usually a number that satisfies: 2.0≦a+b 10≦4.0, and is preferably a number within a range from 1.7 to 3.5.

The above compositional formula (1) indicates that the average elemental ratio between silicon, carbon and oxygen within the amorphous inorganic ceramic material is represented by 1:a:b. If a is smaller than 0.5, then the strength of molded items comprising the material, such as fibers, is unsatisfactory. In contrast, if a is larger than 3.0, then the material is unsatisfactory from a heat resistance perspective. Furthermore, if b is smaller than 0.5, then the material is undesirable from an economic perspective. In contrast, if b is larger than 4.0, then the strength of molded items is unsatisfactory. Moreover, the hydrogen mass fraction relative to the entire mass of the ceramic material is preferably within a range from 0 to 0.5% by mass. If the hydrogen mass fraction is greater than 1% by mass, then the material is unsatisfactory from a heat resistance perspective. The ceramic material comprises essentially silicon, carbon and oxygen, and may also optionally include hydrogen. Other elements (for example, elements such as potassium or sodium incorporated within the raw materials) may also be included provided they do not impair the object or effects of the present invention, but the quantity of such other elements is preferably not more than 2.0% by mass, and is even more preferably within a range from 0 to 1.0% by mass. Furthermore, in terms of the strength of molded items, the value of a+b normally satisfies: 2.0≦a+b≦4.0, and is preferably in a range of 1.7 to 3.5.

The above amorphous inorganic ceramic material is provided in a variety of forms. For example, it can be provided as a molded item that has been molded into a specific shape, such as in the form of a fiber. Furthermore, it may also be provided as a nonwoven fabric that comprises such a fiber.

In the present specification, the term "nonwoven fabric" refers to any known nonwoven fabrics including bonded fabrics, felt, etc.

In the following description, the ceramic material in a fibrous form or in the form of a nonwoven fabric may also be referred to as simply an "inorganic fiber" and an "inorganic nonwoven fabric" respectively.

An inorganic fiber of the present invention typically has a diameter of 0.1 to 50 µm. For diameters within this range, the fibrous form can be readily maintained, and the fiber can be produced stably and easily. The lower limit for the diameter is preferably 0.5 µm or greater, even more preferably 1 µm or greater, and even more preferably 5 µm or greater, whereas the upper limit is preferably not more than 30 µm. If the fiber is too thick, then production of a nonwoven fabric tends to become difficult.

[Method of Producing Amorphous Inorganic Ceramic Material]

The amorphous inorganic ceramic material can be obtained, for example, by heating a non-melting solid silicone under a non-oxidizing atmosphere at a temperature within a range from 400 to 1,500° C.

According to the above method, dissociation of the hydrogen atoms that exist within the non-melting solid silicone causes an inorganic ceramic conversion process. In the following description, this process is sometimes simply referred to as "ceramicization".

In order to obtain the amorphous inorganic ceramic material as a molded item with a specific shape, the non-melting solid silicone is first molded into the prescribed shape, and the molded item is then supplied to the above heat treatment.

For example, a fibrous or nonwoven fabric-type amorphous inorganic ceramic material can be obtained by first molding the non-melting solid silicone into a fibrous or nonwoven fabric-type form, and then conducting the heat treatment described above.

As follows is a description of the above production method.

Examples of the non-melting solid silicone used as the starting raw material include non-melting silicone resins and the cured products of curable silicone compositions. First is a description of non-melting silicone resins.

- Non-Melting Silicone Resins -

A non-melting silicone resin can be obtained by converting a meltable silicone resin to a non-melting form. This conversion to a non-melting form can be achieved, for example, by treating the meltable silicone resin with an inorganic acid. It is thought that the treatment with an inorganic acid causes a dehydration condensation between the residual hydrocarbyloxy groups and silanol groups within the meltable silicone resin, thereby causing a cross-linking reaction that increases the density of three dimensional network structures, resulting in the silicone resin developing non-melting properties. The non-melting silicone resin does not melt even at high temperatures, so that for example in the case of a fibrous material, individual fibers do not fuse together, and furthermore, the resin does not melt in the following heat treatment conducted under a non-oxidizing atmosphere.

Here, the term "meltable silicone resin" refers to a silicone resin that is a solid at room temperature, but has a softening point. In other words, as the temperature of the meltable silicone resin is raised, the resin either melts or softens at the softening point.

Examples of the inorganic acid used in the non-melting treatment described above includes gaseous acids such as hydrogen chloride gas, and liquids such as hydrochloric acid and sulfuric acid. The nature and concentration of the inorganic acid can be selected appropriately in accordance with the quantity of phenyl groups incorporated within the meltable silicone resin used as the raw material. In those cases where the quantity of phenyl groups incorporated within the meltable silicone resin is low, for example in those cases where the ratio of phenyl groups relative to the combined total of organic groups and hydroxyl groups bonded to silicon atoms within the silicone resin (hereafter, this ratio is referred to as the "phenyl group content") is within a range from 0 to 5 mol %, the use of hydrochloric acid with a concentration of not more than 50% by mass is preferred, the use of hydrochloric acid with a concentration of not more than 30% by mass is even more preferred, and the use of hydrochloric acid with a concentration of 10 to 25% by mass is particularly desirable. By using such an inorganic acid, siloxane equilibration reactions are less likely to occur during the non-melting treatment, meaning the shape of molded items can be more readily maintained. In contrast, in those cases where the phenyl group content within the meltable silicone resin is high, for example in cases where the phenyl group content exceeds 5 mol % but is not more than 25 mol %, the use of hydrogen chloride gas or sulfuric acid or the like is preferred. By using such an inorganic acid, the non-melting treatment reaction can proceed rapidly even in those cases where the large quantity of phenyl groups causes significant steric hindrance.

In those cases where a gaseous inorganic acid is used, the treatment with an inorganic acid can be conducted by bringing the molded item generated by melt molding into contact with an atmosphere containing the inorganic acid, whereas in those cases where a liquid inorganic acid is used, the treatment can be conducted by immersing the molded item in the inorganic acid. The treatment temperature is typically within a range from 5 to 50° C., and is preferably from 10 to 30° C., and the non-melting treatment time is typically within a range from 10 to 50 hours.

The meltable silicone resin preferably has a softening point that is at an ideal temperature for melting and molding (such as melt spinning). In other words, if the resin exhibits fluidity that is suited to molding, then the workability and moldability both improve. Specifically, as described below, molding is usually conducted at a temperature within a range from 50 to 200° C., and in such cases the softening point of the meltable silicone resin is typically within a range from 40 to 150° C., and is preferably from 40 to 100° C. If the softening point is too high relative to the melting and molding temperatures, then the fluidity of the silicone resin during molding is poor, which causes a deterioration in the workability, whereas if the softening point is very close and the fluidity is overly high, then the moldability deteriorates, and fiber breakage becomes more likely during fiber spinning. The melting and molding of the meltable silicone resin is conducted under an inert gas atmosphere of argon gas or nitrogen gas or the like, and is preferably conducted under an atmosphere of argon gas.

Examples of the meltable silicone resin include the silicone resins represented by an average composition formula (2) shown below:

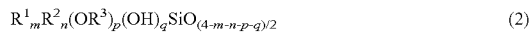
$$R^1_m R^2_n (OR^3)_p (OH)_q SiO_{(4-m-n-p-q)/2} \quad (2)$$

(wherein, each $R^1$ represents, independently, a hydrogen atom or a monovalent hydrocarbon group other than an aryl group that may be identical to, or different from, the other $R^1$ groups and may include a carbonyl group, $R^2$ represents a phenyl group, $R^3$ represents identical or different monovalent hydrocarbon groups of 1 to 4 carbon atoms, m represents a number that satisfies: $0.1 \leq m \leq 2$, n represents a number that satisfies: $0 \leq n \leq 2$, p represents a number that satisfies: $0 \leq p \leq 1.5$, and q represents a number that satisfies: $0 \leq q \leq 0.35$, provided that $p+q>0$ and $0.1 \leq m+n+p+q \leq 2.6$).

Each of the above $R^1$ groups preferably represents, independently, either a hydrogen atom, or a monovalent hydrocarbon group other than an aryl group that may be identical to, or different from, the other $R^1$ groups, may include a carbonyl group, and contains from 1 to 8 carbon atoms. Specific examples of $R^1$ include a hydrogen atom; alkyl groups such as a methyl group, ethyl group, propyl group, butyl group, pentyl group or hexyl group; cycloalkyl groups such as a cyclopentyl group or cyclohexyl group; alkenyl groups such as a vinyl group, allyl group, propenyl group, isopropenyl group or butenyl group; and acyl groups such as an acryloyl group or methacryloyl group. From the viewpoint of ease of availability of the raw material, $R^1$ is preferably a hydrogen atom, methyl group, ethyl group or vinyl group. In those cases where $R^1$ is a hydrogen atom, the reactive Si—H groups that exist within the silicone resin prevent mutual fusion from occurring when a molded item (such as a fiber) formed of the non-melting silicone resin is heated to effect ceramicization.

The aforementioned m is a number that satisfies: $0.1 \leq m \leq 2$, and is preferably not more than 1.5, and m is also preferably at least 0.1, and even more preferably 0.5 or greater. Provided the value of m falls within this range, the viscosity and fluidity of the meltable silicone resin during melting and molding (such as melt spinning) are more likely to produce suitable levels of moldability and workability. Furthermore, weight reduction during ceramicization by heating can also be more readily suppressed.

The aforementioned $R^2$ group is a phenyl group, which has the function of increasing the melting point or softening point of the meltable silicone resin, and can therefore be used to adjust the viscosity and fluidity during melt spinning.

The aforementioned n is a number that satisfies: $0 \leq n \leq 2$, and is preferably not more than 1.5, and n is also preferably at least 0.05, and even more preferably 0.1 or greater. Provided the value of n falls within this range, the phenyl group content is not too high, and weight reduction during ceramicization of the non-melting silicone resin by heating can also be more readily suppressed.

Specific examples of the monovalent hydrocarbon group of 1 to 4 carbon atoms represented by $R^3$ include alkyl groups of 1 to 4 carbon atoms such as a methyl group, ethyl group, propyl group, isopropyl group, butyl group or isobutyl group, and a methyl group is particularly preferred industrially. If $R^3$ is a monovalent hydrocarbon group containing 5 or more carbon atoms, then the reactivity of the group represented by $OR^3$ becomes overly poor, which means when a molded item formed of the non-melting silicone resin is heated to effect ceramicization, there is an increased chance of fusion occurring between the molded items such as fibers.

The aforementioned p indicates the quantity of the silicon atom-bonded hydrocarbyloxy groups represented by $OR^3$ and is a number that satisfies: $0 \leq p \leq 1.5$, and p is preferably not more than 1.2, and is also preferably at least 0.05 and even more preferably 0.1 or greater. Provided the value of p falls within this range, the hydrocarbyloxy group content within the structure is not too high, and the molecular weight of the silicone resin can be maintained at a high value. Accordingly, weight reduction caused by elimination of silicon or carbon during ceramicization of a non-melting silicone resin molded item by heating can be suppressed.

The aforementioned q indicates the quantity of silicon atom-bonded hydroxyl groups and is a number that satisfies: $0 \leq q \leq 0.35$, and q is preferably a number that satisfies: $0 \leq q \leq 0.3$, and is most preferably 0. The value of q represents the small quantity of residual hydroxyl groups retained within the meltable silicone resin during production. Provided the value of q falls within the above range, the reactivity of the silanol groups can be suppressed for the meltable silicone resin as a whole, and both the storage stability of the meltable silicone resin, and the stability and workability during melt molding can be improved.

The value of p+q indicates the combined quantity of hydrocarbyloxy groups and hydroxyl groups, wherein $p+q>0$. The hydrocarbyloxy groups (preferably alkoxy groups) and/or hydroxyl groups are necessary for forming cross-links via hydrolysis condensation reactions during the non-melting treatment described above. The combined total of these groups is preferably within a range from 1 to 15% by mass within the meltable silicone resin, and is even more preferably from 2 to 10% by mass.

The value of m+n+p+q is a number that satisfies: $0.1 \leq m+n+p+q \leq 2.6$. Provided the value of m+n+p+q is within this range, weight reduction during ceramicization of the non-melting silicone resin by heating can also be more readily suppressed.

The molecular weight of the meltable silicone resin is preferably such that the resin has an appropriate softening point as described above. For example, the weight average molecular weight measured using gel permeation chromatography (hereafter abbreviated as GPC) and referenced against polystyrene standards is preferably at least 600, and is even more preferably within a range from 1,000 to 10,000.

There are no particular restrictions on the meltable silicone resin provided it satisfies the conditions described above, although a silicone resin that includes methyl groups within its structure is preferred. The meltable silicone resin may be either a single resin, or a combination of two or more resins with different molecular structures or different proportions of the various siloxane units.

These types of meltable silicone resins can be produced by conventional methods. For example, the target meltable silicone resin can be produced by conducting a cohydrolysis, if required in the presence of an alcohol of 1 to 4 carbon atoms, of the organochlorosilanes that correspond with the siloxane units incorporated within the structure of the target resin, using a ratio between the organochlorosilanes that reflects the ratio between the corresponding siloxane units, while removing the by-product hydrochloric acid and low boiling point components. Furthermore, in those cases where alkoxysilanes, silicone oils or cyclic siloxanes are used as starting raw materials, the target silicone resin can be obtained by using an acid catalyst such as hydrochloric acid, sulfuric acid or methanesulfonic acid, adding water to effect the hydrolysis if required, and following completion of the polymerization reaction, removing the acid catalyst and low boiling point components.

- Cured Products of Curable Silicone Compositions -

Next is a description of cured products of curable silicone compositions, which are another example of non-melting solid silicones that can be used as the starting raw material within the method of producing an amorphous inorganic ceramic material described above.

Conventional materials can be used as this curable silicone composition. Specific examples of suitable compositions include addition-curable, ultraviolet light-curable, electron beam-curable, and condensation-curable silicone compositions. Examples of addition-curable silicone compositions include silicone compositions in which a straight-chain organopolysiloxane having alkenyl groups such as vinyl groups at the molecular chain terminals (either at one terminal or both terminals) and/or at non-terminal positions within the molecular chain, and an organohydrogenpolysiloxane are reacted (via a hydrosilylation reaction) in the presence of a platinum group metal-based catalyst to effect the curing process. Examples of ultraviolet light-curable silicone compositions include silicone compositions that undergo curing as a result of the energy of ultraviolet light having a wavelength within a range from 200 to 400 nm. In this case, there are no particular restrictions on the cured structure. Specific examples of suitable compositions include acrylic silicone-based silicone compositions comprising an organopolysiloxane containing acrylic groups or methacrylic groups, and a photopolymerization initiator, mercapto-vinyl addition polymerization-based silicone compositions comprising a mercapto group-containing organopolysiloxane, an organopolysiloxane that contains alkenyl groups such as vinyl groups, and a photopolymerization initiator, addition reaction-based silicone compositions that use the same platinum group metal-based catalysts as heat curable, addition reaction-type compositions, and cationic polymerization-based silicone compositions comprising an organopolysiloxane containing epoxy groups, and an onium salt catalyst, and any of these compositions can be used as an ultraviolet light-curable silicone composition. Examples of electron beam-curable silicone compositions that can be used include any of the silicone compositions that are cured by a radical polymerization that is initiated by irradiating an organopolysiloxane containing radical polymerizable groups with an electron beam. Examples of condensation-curable silicone compositions include silicone compositions that are cured by conducting a reaction between an organopolysiloxane with both terminals blocked with silanol groups, and an organohydrogenpolysiloxane or a hydrolyzable silane such as a tetraalkoxysilane or an organotrialkoxysilane and/or a partial hydrolysis-condensation product thereof, in the presence of a condensation reaction catalyst such as an organotin-based catalyst, or silicone compositions that are cured by reacting an organopolysiloxane with both terminals blocked with alkoxy group-containing siloxy groups or alkoxy group-containing siloxyalkyl groups, such as trialkoxysiloxy groups, dialkoxyorganosiloxy groups, trialkoxysiloxyethyl groups or dialkoxyorganosiloxyethyl groups, in the presence of a condensation reaction catalyst such as an organotin-based catalyst. However, in order to obtain the above solid silicone with favorable dimensional stability, an addition-curable composition with minimal volume shrinkage is preferred.

As follows is a detailed description of representative examples of the curable silicone compositions described above, with the focus of the description on those components other than the inorganic filler, although any of the compositions may also include, optionally, an inorganic filler or any other well known conventional additives.

<Addition-Curable Silicone Compositions>

Specific examples of suitable addition-curable silicone compositions include addition-curable silicone compositions comprising:

(a) an organopolysiloxane containing at least two alkenyl groups bonded to silicon atoms, (b) an organohydrogenpolysiloxane containing at least two hydrogen atoms bonded to silicon atoms (namely, SiH groups), in sufficient quantity that the quantity of hydrogen atoms bonded to silicon atoms within this component (b) relative to each 1 mol of alkenyl groups within the entire curable silicone composition is within a range from 0.1 to 5.0 mols, and (c) an effective quantity of a platinum group metal-based catalyst.

- Component (a)

The organopolysiloxane of the component (a) is the base polymer of the addition-curable silicone composition, and contains at least two alkenyl groups bonded to silicon atoms. Conventional organopolysiloxanes can be used as the component (a). The weight average molecular weight of the organopolysiloxane of the component (a), measured by gel permeation chromatography and referenced against polystyrene standards, is preferably within a range from approximately 3,000 to 300,000. Moreover, the viscosity at 25° C. of the organopolysiloxane of the component (a) is preferably within a range from 100 to 1,000,000 mPa·s, and is even more preferably from 200 to 100,000 mPa·s. The organopolysiloxane (a) is basically either a straight-chain structure with no branching, in which the molecular chain (the principal chain) comprises repeating diorganosiloxane units ($(R^4)_2SiO_{2/2}$ units), and both molecular chain terminals are blocked with triorganosiloxy groups ($(R^4)_3SiO_{1/2}$ units), or a cyclic structure with no branching in which the molecular chain comprises repeating diorganosiloxane units, although the structure may also include partial branch structures comprising $R^4SiO_{3/2}$ units and/or $SiO_{4/2}$ units (here, $R^4$ represents identical or different, unsubstituted or substituted monovalent hydrocarbon groups that preferably contain from 1 to 10 carbon atoms, and even more preferably from 1 to 8 carbon atoms).

Examples of the component (a) include organopolysiloxanes containing at least two alkenyl groups within each molecule, represented by an average composition formula (3) shown below.

$$R^4{}_c SiO_{(4-c)/2} \qquad (3)$$

(wherein, $R^4$ is as defined above, and c represents a positive number within a range from 1.5 to 2.8, preferably from 1.8 to 2.5, and even more preferably from 1.95 to 2.05).

Examples of the monovalent hydrocarbon groups represented by $R^4$ include alkyl groups such as a methyl group, ethyl group, propyl group, isopropyl group, butyl group, isobutyl group, tert-butyl group, pentyl group, neopentyl group, hexyl group, cyclohexyl group, octyl group, nonyl group or decyl group; aryl groups such as a phenyl group, tolyl group, xylyl group or naphthyl group; aralkyl groups such as a benzyl group, phenylethyl group or phenylpropyl group; alkenyl groups such as a vinyl group, allyl group, propenyl group, isopropenyl group, butenyl group, hexenyl group, cyclohexenyl group or octenyl group; and groups in which either a portion of, or all of, the hydrogen atoms within the above hydrocarbon groups have been substituted with a halogen atom such as a fluorine, bromine or chlorine atom, or a cyano group or the like, including a chloromethyl group, chloropropyl group, bromoethyl group, trifluoropropyl group, or cyanoethyl group.

In this case, at least two of the $R^4$ groups represent alkenyl groups (which preferably contain from 2 to 8 carbon atoms, and even more preferably from 2 to 6 carbon atoms). The alkenyl group quantity relative to the total of all the organic groups bonded to silicon atoms (that is, the proportion of alkenyl groups amongst all the unsubstituted and substituted monovalent hydrocarbon groups represented by $R^4$ within the above average composition formula (3)) is typically within a range from 0.01 to 20 mol %, and is preferably from 0.1 to 10 mol %. In those cases where the organopolysiloxane of the component (a) has a straight-chain structure, these alkenyl groups may be bonded solely to silicon atoms at the molecular chain terminals, solely to non-terminal silicon atoms within the molecular chain, or to both these types of silicon atoms, although from the viewpoints of the composition curing rate and the physical properties of the resulting cured product, at least one alkenyl group is preferably bonded to a silicon atom at a molecular chain terminal.

The aforementioned $R^4$ groups may essentially be any of the above groups, although the alkenyl groups are preferably vinyl groups, and the monovalent hydrocarbon groups other than the alkenyl groups are preferably methyl groups or phenyl groups.

Specific examples of the component (a) include compounds represented by the general formulas shown below.

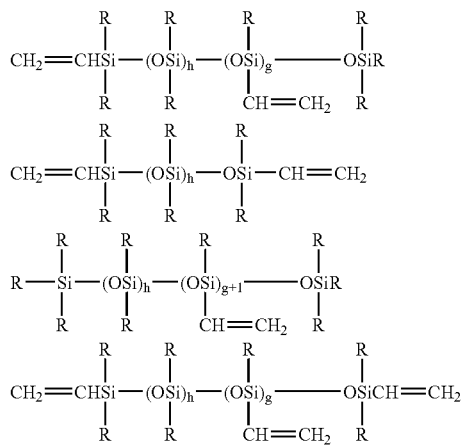

In the above general formulas, R has the same meaning as $R^4$ with the exception of not including alkenyl groups. g and h are integers that satisfy g≧1 and h≧0 respectively, and the value of g+h is a number that enables the molecular weight and viscosity of the organopolysiloxane to satisfy the values described above.

- Component (b)

The organohydrogenpolysiloxane of the component (b) contains at least two (typically from 2 to 200), and preferably three or more (typically from 3 to 100) hydrogen atoms bonded to silicon atoms (SiH groups). The component (b) reacts with the component (a) and functions as a cross-linking agent. There are no particular restrictions on the molecular structure of the organohydrogenpolysiloxane, and conventionally produced linear, cyclic, branched, or three dimensional network (resin-like) organohydrogenpolysiloxanes can be used as the component (b). In those cases where the component (b) has a linear structure, the SiH groups may be bonded solely to silicon atoms at the molecular chain terminals, or solely to non-terminal silicon atoms within the molecular chain, or may also be bonded to both these types of silicon atoms. Furthermore, the number of silicon atoms within each molecule (namely, the polymerization degree) is typically within a range from 2 to 300, and is preferably from 4 to 150, and an organohydrogenpolysiloxane that is liquid at 25° C. is particularly favorable as the component (b).

Examples of the component (b) include organohydrogenpolysiloxanes represented by an average composition formula (4) shown below.

(4)

(wherein, $R^5$ represents identical or different, unsubstituted or substituted monovalent hydrocarbon groups of 1 to 10 carbon atoms, d and e represent positive numbers that preferably satisfy 0.7≦d≦2.1, 0.001≦e≦1.0 and 0.8≦d+e≦3.0, and even more preferably satisfy 1.0≦d≦2.0, 0.01≦e≦1.0 and 1.5≦d+e≦2.5)

Examples of the group $R^5$ include the same groups as those described above for the group $R^4$ within the above average composition formula (3) (but excluding the alkenyl groups).

Specific examples of organohydrogenpolysiloxanes represented by the above average composition formula (4) include 1,1,3,3-tetramethyldisiloxane, 1,3,5,7-tetramethylcyclotetrasiloxane, tris(hydrogendimethylsiloxy)methylsilane, tris(hydrogendimethylsiloxy)phenylsilane, methylhydrogencyclopolysiloxane, cyclic copolymers of methylhydrogensiloxane and dimethylsiloxane, methylhydrogenpolysiloxane with both terminals blocked with trimethylsiloxy groups, copolymers of dimethylsiloxane and methylhydrogensiloxane with both terminals blocked with trimethylsiloxy groups, dimethylpolysiloxane with both terminals blocked with dimethylhydrogensiloxy groups, copolymers of dimethylsiloxane and methylhydrogensiloxane with both terminals blocked with dimethylhydrogensiloxy groups, copolymers of methylhydrogensiloxane and diphenylsiloxane with both terminals blocked with trimethylsiloxy groups, copolymers of methylhydrogensiloxane, diphenylsiloxane and dimethylsiloxane with both terminals blocked with trimethylsiloxy groups, copolymers of methylhydrogensiloxane, methylphenylsiloxane and dimethylsiloxane with both terminals blocked with trimethylsiloxy groups, copolymers of methylhydrogensiloxane, dimethylsiloxane and diphenylsiloxane with both terminals blocked with dimethylhydrogensiloxy groups, copolymers of methylhydrogensiloxane, dimethylsiloxane and methylphenylsiloxane with both terminals blocked with dimethylhydrogensiloxy groups, copolymers composed of $(CH_3)_2HSiO_{1/2}$ units, $(CH_3)_3SiO_{1/2}$ units and $SiO_{4/2}$ units, copolymers composed of $(CH_3)_2HSiO_{1/2}$ units and $SiO_{4/2}$ units, and copolymers composed of $(CH_3)_2HSiO_{1/2}$ units, $SiO_{4/2}$ units and $(C_6H_5)_3SiO_{1/2}$ units.

The quantity added of the component (b) must be sufficient that the quantity of SiH groups within this component (b), relative to each 1 mol of alkenyl groups bonded to silicon atoms within the component (a), is within a range from 0.1 to 5.0 mols, preferably from 0.5 to 3.0 mols, and even more preferably from 0.8 to 2.0 mols. If the quantity added of the component (b) yields a quantity of SiH groups that is less than 0.1 mols, then the cross-linking density of the cured product obtained from the composition is too low, which has an adverse effect on the heat resistance of the cured product. In contrast, if the quantity added yields a quantity of SiH groups that exceeds 5.0 mols, then foaming problems caused by a dehydrogenation reaction may occur within the cured product, and the heat resistance of the resulting cured product may also deteriorate.

- Component (c)

The platinum group metal-based catalyst of the component (c) is used for accelerating the addition curing reaction (the hydrosilylation) between the component (a) and the component (b). Conventional platinum group metal-based catalysts can be used as the component (c), although the use of platinum or a platinum compound is preferred. Specific examples of the component (c) include platinum black, platinic chloride, chloroplatinic acid, alcohol-modified chloroplatinic acid, and coordination compounds of chloroplatinic acid with olefins, aldehydes, vinylsiloxanes or acetylene alcohols.

The quantity added of the component (c) need only be an effective catalytic quantity, may be suitable increased or decreased in accordance with the desired curing rate, and preferably yields a mass of the platinum group metal relative to the mass of the component (a) that falls within a range from 0.1 to 1,000 ppm, and even more preferably from 1 to 200 ppm.

The temperature conditions used for curing the addition-curable silicone composition are preferably within a range from 60 to 180° C., and even more preferably from 80 to 160° C. The curing time is preferably within a range from 1 minute to 3 hours, and even more preferably from 3 minutes to 2 hours. Furthermore, secondary curing may also be conducted if required, and the temperature conditions during such secondary curing are preferably at least 120° C., and even more preferably within a range from 150 to 250° C. The secondary curing time is preferably within a range from 10 minutes to 48 hours, and even more preferably from 30 minutes to 24 hours.

<Ultraviolet Light-Curable Silicone Compositions>

Specific examples of suitable ultraviolet light-curable silicone compositions include ultraviolet light-curable silicone compositions comprising:

(d) an ultraviolet light-reactive organopolysiloxane, and
(e) a photopolymerization initiator.

- Component (d)

The ultraviolet light-reactive organopolysiloxane of the component (d) typically functions as the base polymer of the ultraviolet light-curable silicone composition. Although there are no particular restrictions on the component (d), the component (d) is preferably an organopolysiloxane containing at least two, even more preferably from 2 to 20, and most preferably from 2 to 10, ultraviolet light-reactive groups within each molecule. The plurality of ultraviolet light-reactive groups that exist within this organopolysiloxane may be the same, or different.

The organopolysiloxane of the component (d) is preferably basically either a straight-chain structure with no branching, in which the molecular chain comprises repeating diorganosiloxane units, and both molecular chain terminals are blocked with triorganosiloxy groups or triorganosilyl-substituted alkyl groups such as triorganosilylethyl groups, or a cyclic structure with no branching in which the molecular chain comprises repeating diorganosiloxane units, although the structure may also include partial branched structures such as trifunctional siloxane units and $SiO_2$ units. In those cases where the organopolysiloxane of the component (d) has a straight-chain structure, the ultraviolet light-reactive groups may exist solely at the molecular chain terminals, solely at non-terminal positions within the molecular chain, or may also exist at both these positions, although structures containing ultraviolet light-reactive groups at least at the molecular chain terminals are preferred.

The ultraviolet light-reactive groups may be directly bonded to silicon atoms constituting the backbone chain of the organopolysiloxane of the component (d) or bonded to silicon atoms via linkage groups such as alkylene groups, depending on the types of the ultraviolet light-reactive groups.

Examples of suitable ultraviolet light-reactive groups include alkenyl groups such as a vinyl group, allyl group or propenyl group; alkenyloxy groups such as a vinyloxy group, allyloxy group, propenyloxy group or isopropenyloxy group; aliphatic unsaturated groups other than alkenyl groups, such as an acryloyl group or methacryloyl group; as well as a mercapto group, epoxy group, or hydrosilyl group, and of these, an acryloyl group, methacryloyl group, mercapto group, epoxy group or hydrosilyl group is preferred, and an acryloyl group or methacryloyl group is particularly desirable.

Although there are no particular restrictions on the viscosity of the organopolysiloxane, the viscosity at 25° C. is preferably at least 25 mPa·s, and is even more preferably within a range from 100 to 10,000,000 mPa·s, and most preferably from 100 to 100,000 mPa·s.

Examples of preferred forms of the component (d) include organopolysiloxanes containing at least two ultraviolet light-reactive groups, represented by either a general formula (5) shown below:

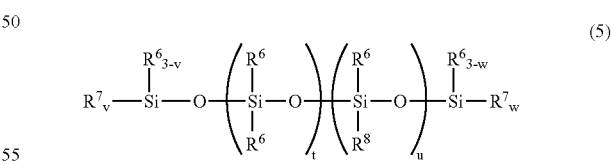

(5)

[wherein, $R^6$ represents identical or different, unsubstituted or substituted monovalent hydrocarbon groups that contain no ultraviolet light-reactive groups, $R^7$ and $R^8$ each represent identical or different ultraviolet light-reactive groups or groups that contain an ultraviolet light-reactive group, t represents an integer from 5 to 1,000, u represents an integer from 0 to 100, v represents an integer from 0 to 3, and w represents an integer from 0 to 3, provided that $v+w+u \geq 2$]

or a general formula (6) shown below:

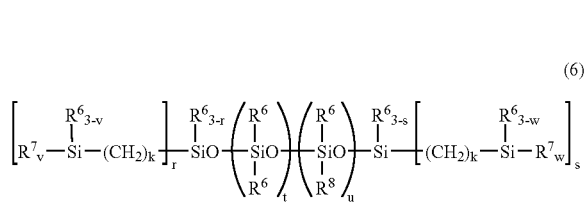

[wherein, $R^6$, $R^7$, $R^8$, t, u, v and w are as defined above for the general formula (5), k represents an integer from 2 to 4, and r and s each represent an integer from 1 to 3, provided that $vr+ws+u \geq 2$].

In the above general formulas (5) and (6), $R^6$ represents identical or different, unsubstituted or substituted monovalent hydrocarbon groups that contain no ultraviolet light-reactive groups, and preferably contain from 1 to 20, even more preferably from 1 to 10, and most preferably from 1 to 8 carbon atoms. Examples of the monovalent hydrocarbon groups represented by $R^6$ include alkyl groups such as a methyl group, ethyl group, propyl group, butyl group, isopropyl group, isobutyl group, tert-butyl group, hexyl group, 2-ethylhexyl group, 2-ethylbutyl group, or octyl group; cycloalkyl groups such as a cyclohexyl group or cyclopentyl group; aryl groups such as a phenyl group, tolyl group, xylyl group, naphthyl group, or diphenyl group; aralkyl groups such as a benzyl group or phenylethyl group; and groups in which a portion of, or all of, the hydrogen atoms bonded to carbon atoms within the above hydrocarbon groups have been substituted with a halogen atom, cyano group, amino group, or carboxyl group or the like, including a chloromethyl group, trifluoropropyl group, 2-cyanoethyl group, and 3-aminopropyl group, and of these, a methyl group or phenyl group is preferred, and a methyl group is particularly desirable. Furthermore, the monovalent hydrocarbon group represented by $R^6$ may also include one or more sulfonyl groups, ether linkages (—O—) or carbonyl groups or the like within the group skeleton.

In the above general formulas (5) and (6), examples of the ultraviolet light-reactive groups represented by $R^7$ and $R^8$ are as described above. The groups containing an ultraviolet light-reactive group mean groups which are formed of an ultraviolet light-reactive group and at least one linkage group to which the ultraviolet light-reactive group is bonded, and are bonded to silicon atoms at the linkage group, and specific examples thereof include a 3-glycidoxypropyl group, 2-(3,4-epoxycyclohexyl)ethyl group, 3-methacryloyloxypropyl group, 3-acryloyloxypropyl group, 3-mercaptopropyl group, 2-{bis(2-methacryloyloxyethoxy)methylsilyl}ethyl group, 2-{(2-methacryloyloxyethoxy)dimethylsilyl}ethyl group, 2-{bis(2-acryloyloxyethoxy)methylsilyl}ethyl group, 2-{(2-acryloyloxyethoxy)dimethylsilyl}ethyl group, 2-{bis(1,3-dimethacryloyloxy-2-propoxy)methylsilyl}ethyl group, 2-{(1,3-dimethacryloyloxy-2-propoxy)dimethylsilyl}ethyl group, 2-{bis(1-acryloyloxy-3-methacryloyloxy-2-propoxy)methylsilyl}ethyl group, and 2-{(1-acryloyloxy-3-methacryloyloxy-2-propoxy)dimethylsilyl}ethyl group, examples of preferred groups include a 3-methacryloyloxypropyl group, 3-acryloyloxypropyl group, 2-{bis(2-methacryloyloxyethoxy)methylsilyl}ethyl group, 2-{(2-methacryloyloxyethoxy)dimethylsilyl}ethyl group, 2-{bis(2-acryloyloxyethoxy)methylsilyl}ethyl group, 2-{(2-acryloyloxyethoxy)dimethylsilyl}ethyl group, 2-{bis(1,3-dimethacryloyloxy-2-propoxy)methylsilyl}ethyl group, 2-{(1,3-dimethacryloyloxy-2-propoxy)dimethylsilyl}ethyl group, 2-{bis(1-acryloyloxy-3-methacryloyloxy-2-propoxy)methylsilyl}ethyl group, and 2-{(1-acryloyloxy-3-methacryloyloxy-2-propoxy)dimethylsilyl}ethyl group, and examples of more preferred groups include a 3-acryloyloxypropyl group, 2-{bis(2-methacryloyloxyethoxy)methylsilyl}ethyl group, 2-{(2-methacryloyloxyethoxy)dimethylsilyl}ethyl group, 2-{(2-acryloyloxyethoxy)dimethylsilyl}ethyl group, 2-{bis(1,3-dimethacryloyloxy-2-propoxy)methylsilyl}ethyl group, and 2-{bis(1-acryloyloxy-3-methacryloyloxy-2-propoxy)methylsilyl}ethyl group.

In general formulas (5) and (6), $R^7$ and $R^8$ may be either the same or different, and individual $R^7$ and $R^8$ groups may be the same as, or different from, other $R^7$ and $R^8$ groups.

In the above general formulas (5) and (6), t is typically an integer within a range from 5 to 1,000, and is preferably an integer from 10 to 800, and even more preferably from 50 to 500. u is typically an integer within a range from 0 to 100, and is preferably an integer from 0 to 50, and even more preferably from 0 to 20. v is typically an integer within a range from 0 to 3, and is preferably an integer from 0 to 2, and even more preferably either 1 or 2. w is preferably an integer from 0 to 2, and is even more preferably either 1 or 2. In the above general formula (6), k is typically an integer within a range from 2 to 4, and is preferably either 2 or 3. r and s each represent an integer from 1 to 3, and preferably represent either 1 or 2. Moreover, as described above, the organopolysiloxanes represented by the above general formulas (5) and (6) contain at least two of the above ultraviolet light-reactive groups, and consequently $v+w+u \geq 2$ in the formula (5), and $vr+ws+u \geq 2$ in the formula (6).

Specific examples of organopolysiloxanes represented by the above formulas (5) or (6) include the compounds shown below.

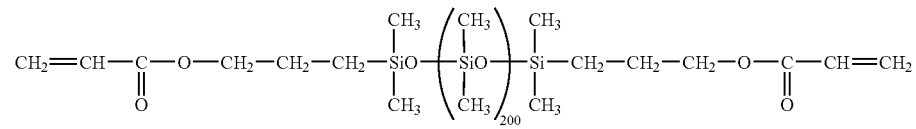

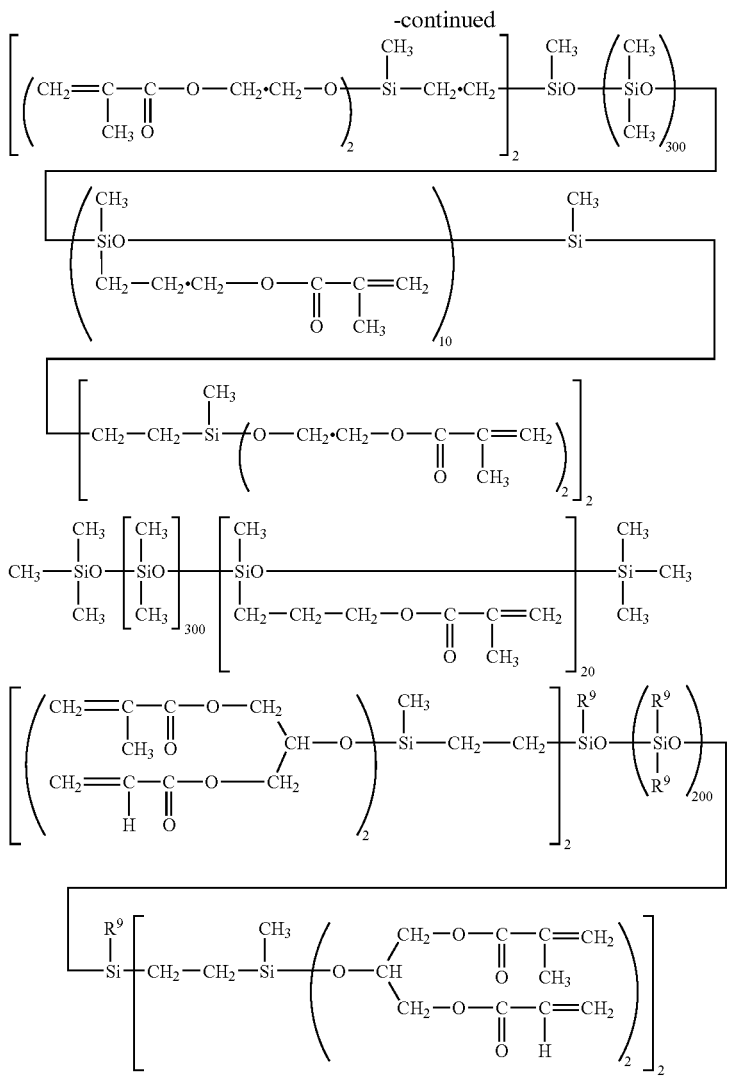

[wherein, 90 mol % of the $R^9$ groups are methyl groups and 10 mol % thereof are phenyl groups]

- Component (e)

The photopolymerization initiator of the component (e) has the effect of accelerating the photopolymerization of the ultraviolet light-reactive groups within the above component (d). There are no particular restrictions on the component (e), and specific examples of suitable initiators include acetophenone, propiophenone, benzophenone, xanthol, fluorein, benzaldehyde, anthraquinone, triphenylamine, 4-methylacetophenone, 3-pentylacetophenone, 4-methoxyacetophenone, 3-bromoacetophenone, 4-allylacetophenone, p-diacetylbenzene, 3-methoxybenzophenone, 4-methylbenzophenone, 4-chlorobenzophenone, 4,4'-dimethoxybenzophenone, 4-chloro-4'-benzylbenzophenone, 3-chloroxanthone, 3,9-dichloroxanthone, 3-chloro-8-nonylxanthone, benzoin, benzoin methyl ether, benzoin butyl ether, bis(4-dimethylaminophenyl)ketone, benzyl methoxy acetal, 2-chlorothioxanthone, diethylacetophenone, 1-hydroxycyclohexyl phenyl ketone, 2-methyl-(4-(methylthio)phenyl)-2-morpholino-1-propane, 2,2-dimethoxy-2-phenylacetophenone, diethoxyacetophenone, and 2-hydroxy-2-methyl-1-phenylpropan-1-one, preferred initiators include benzophenone, 4-methoxyacetophenone, 4-methylbenzophenone, diethoxyacetophenone, 1-hydroxycyclohexyl phenyl ketone, and 2-hydroxy-2-methyl-1-phenylpropan-1-one, and particularly desirable initiators include diethoxyacetophenone, 1-hydroxycyclohexyl phenyl ketone, and 2-hydroxy-2-methyl-1-phenylpropan-1-one. These photopolymerization initiators may be used either alone, or in combinations of two or more different initiators.

Although there are no particular restrictions on the quantity added of the component (e), the quantity is preferably within a range from 0.01 to 10 parts by mass, even more preferably from 0.1 to 3 parts by mass, and most preferably from 0.5 to 3 parts by mass, per 100 parts by mass of the component (d). Provided the quantity added falls within the above range, the cured product obtained upon curing the composition of the present invention exhibits excellent physical properties such as strength and tensile strength.

The ultraviolet light irradiation conditions employed for curing the ultraviolet light-curable silicone composition of the present invention typically involve the use of an ultraviolet light emitting diode with an emission wavelength of 365 nm, and curing can be conducted by irradiation of this ultraviolet light under conditions including an illumination intensity of 5 to 500 mW/cm², and preferably from 10 to 200 mW/cm², and an amount of light of 0.5 to 100 J/cm², and preferably from 10 to 50 J/cm². Furthermore, secondary curing may also be conducted if required, and the temperature conditions during such secondary curing are preferably at least 120° C., and even more preferably within a range from 150 to 250° C. The secondary curing time is preferably within a range from 10 minutes to 48 hours, and even more preferably from 30 minutes to 24 hours.

<Condensation-Curable Silicone Compositions>

Specific examples of suitable condensation-curable silicone compositions include condensation-curable silicone compositions comprising:

(h) an organopolysiloxane containing at least two silicon atom-bonded hydroxyl groups or silicon atom-bonded hydrolyzable groups, preferably at both molecular chain terminals, (i) a hydrolyzable silane and/or a partial hydrolysis-condensation product thereof as an optional component, and (j) a condensation reaction catalyst as another optional component.

- Component (h)

The component (h) is an organopolysiloxane that contains at least two silicon-bonded hydroxyl groups or silicon atom-bonded hydrolyzable groups, and functions as the base polymer of the condensation-curable silicone composition. The organopolysiloxane of the component (h) is basically a straight-chain structure or cyclic structure with no branching, in which the molecular chain comprises repeating diorganosiloxane units, although the structure may also include partial branch structures.

Incidentally, in the present specification, the "hydrolyzable group" refers to a group which can form a hydroxy group upon decomposition by the action of water.

In the organopolysiloxane of the component (h), examples of hydrolyzable groups include acyloxy groups such as an acetoxy group, octanoyloxy group, or benzoyloxy group; ketoxime groups (namely, iminoxy groups) such as a dimethyl ketoxime group, methyl ethyl ketoxime group, or diethyl ketoxime group; alkoxy groups such as a methoxy group, ethoxy group, or propoxy group; alkoxyalkoxy groups such as a methoxyethoxy group, ethoxyethoxy group, or methoxypropoxy group; alkenyloxy groups such as a vinyloxy group, isopropenyloxy group, or 1-ethyl-2-methylvinyloxy group; amino groups such as a dimethylamino group, diethylamino group, butylamino group, or cyclohexylamino group; aminoxy groups such as a dimethylaminoxy group or diethylaminoxy group; and amide groups such as an N-methylacetamide group, N-ethylacetamide group, or N-methylbenzamide group.

These hydrolyzable groups are preferably positioned at both molecular chain terminals of a straight-chain diorganopolysiloxane, preferably in the form of either siloxy groups that contain two or three hydrolyzable groups, or siloxyalkyl groups that contain two or three hydrolyzable groups, including trialkoxysiloxy groups, dialkoxyorganosiloxy groups, triacyloxysiloxy groups, diacyloxyorganosiloxy groups, triiminoxysiloxy groups (namely, triketoximesiloxy groups), diiminoxyorganosiloxy groups, trialkenoxysiloxy groups, dialkenoxyorganosiloxy groups, trialkoxysiloxyethyl groups, and dialkoxyorganosiloxyethyl groups.

The other atoms or groups bonded to silicon atoms, besides the above hydroxyl groups and hydrolyzable groups, are monovalent hydrocarbon groups, and examples of these monovalent hydrocarbon groups include the same unsubstituted or substituted monovalent hydrocarbon groups as those exemplified above in relation to $R^4$ within the above average composition formula (3).

Suitable examples of the component (h) include the organopolysiloxanes with both molecular chain terminals with silicon atom-bonded hydroxyl groups or silicon atom-bonded hydrolyzable groups represented by the formulas shown below.

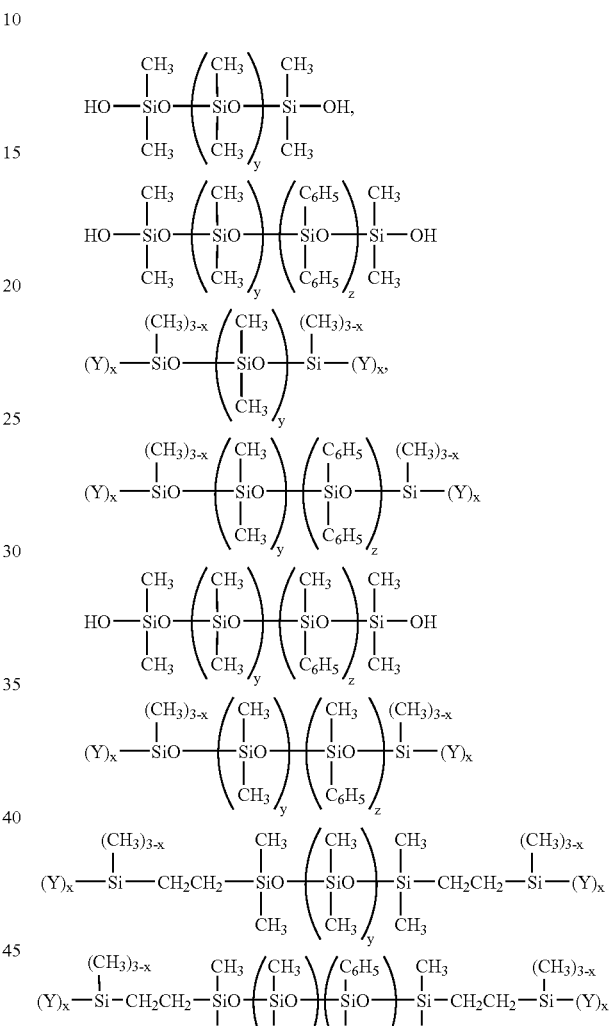

[wherein, Y represents a hydrolyzable group, x represents 1, 2, or 3, and y and z each represent an integer of 1 to 1,000]

Of the organopolysiloxanes represented by the above chemical formulas, specific examples of compounds containing hydrolyzable groups Y at both terminals include dimethylpolysiloxane with both molecular chain terminals blocked with trimethoxysiloxy groups, copolymers of dimethylsiloxane and methylphenylsiloxane with both molecular chain terminals blocked with trimethoxysiloxy groups, copolymers of dimethylsiloxane and diphenylsiloxane with both molecular chain terminals blocked with trimethoxysiloxy groups, dimethylpolysiloxane with both molecular chain terminals blocked with methyldimethoxysiloxy groups, dimethylpolysiloxane with both molecular chain terminals blocked with triethoxysiloxy groups, and dimethylpolysiloxane with both molecular chain terminals blocked with 2-(trimethoxysiloxy)

ethyl groups. These compounds may be used either alone, or in combinations of two or more different compounds.

- Component (i)

The hydrolyzable silane and/or partial hydrolysis-condensation product thereof of the component (i) is an optional component, and functions as a curing agent. In those cases where the base polymer of the component (h) is an organopolysiloxane that contains at least two silicon atom-bonded hydrolyzable groups other than silanol groups within each molecule, the addition of the component (i) to the condensation-curable silicone composition can be omitted. Silanes containing at least three silicon atom-bonded hydrolyzable groups within each molecule and/or partial hydrolysis-condensation products thereof (namely, organopolysiloxanes that still retain at least one, and preferably two or more of the hydrolyzable groups) can be used particularly favorably as the component (i).

Examples of preferred forms of the above hydrolyzable silane include compounds represented by a formula (7) shown below:

$$R^{10}_f SiX_{4-f} \qquad (7)$$

(wherein, $R^{10}$ represents an unsubstituted or substituted monovalent hydrocarbon group, X represents a hydrolyzable group, and f represents either 0 or 1). Examples of $R^{10}$ include alkyl groups such as a methyl group or ethyl group; alkenyl groups such as a vinyl group, allyl group or propenyl group; and aryl groups such as a phenyl group. Examples of X include all of the groups exemplified as potential silicon atom-bonded hydrolyzable groups Y within the aforementioned component (h).

Specific examples of the hydrolyzable silane include methyltriethoxysilane, vinyltriethoxysilane, vinyltriacetoxysilane, ethyl orthosilicate, and partial hydrolysis-condensation products of these compounds. These compounds may be used either alone, or in combinations of two or more different compounds.

In those cases where a hydrolyzable silane and/or partial hydrolysis-condensation product thereof of the component (i) is used, the quantity added is preferably within a range from 0.01 to 20 parts by mass, and even more preferably from 0.1 to 10 parts by mass, per 100 parts by mass of the component (h). In those cases where a component (i) is used, using a quantity within the above range ensures that the composition of the present invention exhibits particularly superior levels of storage stability and adhesiveness, as well as a favorable curing rate.

- Component (j)

The condensation reaction catalyst of the component (j) is an optional component, and is unnecessary in cases where the above hydrolyzable silane and/or partial hydrolysis-condensation product thereof of the component (i) contains aminoxy groups, amino groups, or ketoxime groups or the like. Examples of the condensation reaction catalyst of the component (j) include organotitanate esters such as tetrabutyl titanate and tetraisopropyl titanate; organotitanium chelate compounds such as diisopropoxybis(acetylacetonato)titanium and diisopropoxybis(ethylacetoacetate)titanium; organoaluminum compounds such as aluminum tris(acetylacetonate) and aluminum tris(ethylacetoacetate); organozirconium compounds such as zirconium tetra(acetylacetonate) and zirconium tetrabutyrate; organotin compounds such as dibutyltin dioctoate, dibutyltin dilaurate and dibutyltin (2-ethylhexanoate); metal salts of organic carboxylic acids such as tin naphthenate, tin oleate, tin butyrate, cobalt naphthenate, and zinc stearate; amine compounds or the salts thereof such as hexylamine and dodecylamine phosphate; quaternary ammonium salts such as benzyltriethylammonium acetate; lower fatty acid salts of alkali metals such as potassium acetate; dialkylhydroxylamines such as dimethylhydroxylamine and diethylhydroxylamine; and guanidyl group-containing organosilicon compounds. These catalysts may be used either alone, or in combinations of two or more different catalysts.

In those cases where a condensation reaction catalyst of the component (j) is used, although there are no particular restrictions on the quantity added, the quantity is preferably within a range from 0.01 to 20 parts by mass, and even more preferably from 0.1 to 10 parts by mass, per 100 parts by mass of the component (h). If the component (j) is used, then provided the quantity falls within the above range, the composition of the present invention exhibits superior levels of curability and storage stability.

In order to cure a condensation-curable silicone composition, the composition is usually left to stand in an atmosphere that contains moisture (for example, a humidity within a range from 25 to 90% RH, and preferably from 50 to 85% RH), with the moisture within the atmosphere causing curing. Heating may be conducted to accelerate the curing process. Furthermore, secondary curing may also be conducted if required, and the temperature conditions during such secondary curing are preferably at least 120° C., and even more preferably within a range from 150 to 250° C. The secondary curing time is preferably within a range from 10 minutes to 48 hours, and even more preferably from 30 minutes to 24 hours.

- Production of Fibrous or Nonwoven Fabric-Type Non-Melting Solid Silicones -

In order to produce an amorphous inorganic ceramic material of the present invention in either a fibrous form or in the form of a nonwoven fabric, the non-melting solid silicone subjected to heat treatment must first be produced in a fibrous or nonwoven fabric form. Accordingly, as follows is a description of a method of producing a non-melting solid silicone in either a fibrous or nonwoven fabric form.

<1> Production of Fibrous Non-melting Solid Silicone

Production Method 1-1

A method of producing a fibrous non-melting solid silicone by melt spinning a meltable silicone resin to obtain a meltable silicone resin fiber, and then subjecting the meltable silicone resin fiber to the non-melting treatment described above.

In this method, the melt spinning can be conducted using conventional methods, and can be conducted, for example, using a monofilament spinning apparatus having an orifice diameter within a range from 100 μm to 1 mm, at a temperature within a range from 50 to 200° C. In this case, the softening point of the meltable silicone resin is typically within a range from 40 to 150° C., and is preferably from 40 to 100° C. If the softening point is too high relative to the melt spinning temperature, then the fluidity of the silicone resin during melt spinning becomes undesirably low. The melt spinning is conducted under an inert gas atmosphere of argon gas or nitrogen gas or the like, and is preferably conducted under an atmosphere of argon gas. The speed with which the fiber is wound onto the reel is typically within a range from 100 to 1,000 m/minute, and is preferably from 200 to 500 m/minute. The meltable silicone resin fiber obtained from the melt spinning process has a diameter that typically falls, for example, within a range from 0.1 to 50 μm, and preferably from 5 to 30 μm. The diameter should be selected according to the diameter of a desired inorganic fiber.

An example of a preferred melt spinning method is the melt blow method. In this case, as above, the diameter of the fiber spinning nozzle that extrudes the melted silicone resin is preferably within a range from approximately 100 μm to 1 mm. In a melt blow method, a plurality of nozzles that blow heated gas in the same direction as the direction in which the melted fiber is extruded are usually arranged around the periphery of the fiber spinning nozzle, so that the melted silicone resin extruded from the fiber spinning nozzle is insulated or heated for a predetermined distance. The blow speed of this heated gas is typically within a range from approximately 30 to 300 m/s, and faster speeds enable the production of finer fibers.

-- Production Method 1-2

A method of producing a fibrous cured silicone (namely, a cured silicone fiber) comprising the steps of continuously extruding a curable silicone composition which is liquid at room temperature through an aperture to form a fiber of the curable silicone composition, drawing out the fiber of the curable silicone composition, and curing the fiber of the curable silicone composition while the fiber is drawn out, to obtain said cured silicone fiber.

The curable silicone composition which may be used in this method is liquid at room temperature, and has preferably a viscosity at room temperature of 100 to 1,000,000 mPa·s, and more preferably 200 to 100,000 mPa·s. The cured silicone fiber obtained using this method may be subjected, as is, to a heat treatment to form a fibrous amorphous inorganic ceramic material, or may be first converted to a nonwoven fabric (see the production methods 2-3 and 2-4 below) and then subjected to a heat treatment, thereby forming a nonwoven fabric-type amorphous inorganic ceramic material.

The fiber diameter of this cured silicone fiber is preferably within a range from 0.1 to 50 μm, and is even more preferably from 0.5 to 30 μm. Provided the fiber diameter is within this range, the curing rate of the curable silicone composition is satisfactorily fast, the fiber shape can be more readily maintained, and production of the fiber is simplified. Furthermore, aggregation of the product fiber is unlikely, which facilitates production of a nonwoven fabric.

Examples of the above aperture from which the curable silicone composition is extruded in this method include the nozzle aperture of the fiber spinning nozzle described above. The internal diameter of the aperture can be selected in accordance with factors such as the desired fiber diameter and the extrusion speed of the curable silicone composition, and is typically within a range from 100 μm to 1 mm. Suitable shapes for the aperture include a circle or an ellipse or the like. The number of apertures may be either one or a plurality. In the case of a plurality of apertures, suitable positional arrangements for the apertures include linear, circular, concentric circular, radial, or lattice-like arrangements. Furthermore, in the case of a plurality of apertures, the spacing between apertures is typically within a range from 0.01 to 50 mm, and is preferably from 0.1 to 10 mm.

The extrusion speed of the curable silicone composition is typically within a range from approximately 100 to 10,000 m/minute. Faster extrusion speeds enable the production of fibers with smaller fiber diameters. There are no particular restrictions on the temperature during the continuous extrusion of the curable silicone composition from the aperture, provided the curable silicone composition is maintained in liquid form, and this temperature may be selected appropriately in accordance with the nature of the curable silicone composition. One example of a suitable temperature is room temperature. During production of a silicone fiber using this method, examples of suitable production atmospheres include air, or an inert gas such as argon gas or nitrogen gas.

A receiver is usually positioned below the above aperture, so as to collect the silicone fiber obtained using the above method. There are no particular restrictions on the shape of, or the material used for, the receiver. Suitable shapes for the receiver include flat sheets, dish shapes, open containers, pouches, and belt shapes. Suitable materials for the receiver include metals, plastics, rubbers and glass. In order to ensure the receiver has favorable air permeability, the material is preferably formed with a mesh-like structure or the like. There are no particular restrictions on the height from the aperture to the receiver, provided the curable silicone composition is able to cure during the drawing out of the fiber of curable silicone composition, and this height may be selected appropriately in accordance with factors such as the extrusion speed and the curing rate of the silicone composition.

The various curable silicone compositions and curing methods are as described above, but those operations and the like that are particularly desirable within each of the above methods are described below with reference to each of the different types of curable silicone compositions.

(The Case of an Addition-Curable Silicone Composition)

Using a heating device to heat the addition-curable silicone composition during the drawing out of the fiber of the addition-curable silicone composition causes the hydrosilylation reaction to proceed within the silicone composition, thereby curing the silicone composition and yielding a cured silicone fiber. The heating device is usually positioned close to the path of the silicone composition being drawn out, so that the silicone composition can be heated to a predetermined temperature. Examples of suitable heating devices include heaters and the like. The heating temperature can be selected appropriately in accordance with the fiber diameter, namely the diameter of the aforementioned aperture, and the extrusion speed of the addition-curable silicone composition, and is preferably within a range from 80 to 300° C., and even more preferably from 100 to 200° C. Furthermore, secondary curing may also be conducted if required, and the temperature conditions during such secondary curing are preferably at least 120° C., and even more preferably within a range from 150 to 250° C. The secondary curing time is preferably within a range from 10 minutes to 48 hours, and even more preferably from 30 minutes to 24 hours.

(The Case of an Ultraviolet Light-Curable Silicone Composition)

By irradiating the ultraviolet light-curable silicone composition with ultraviolet light during drawing out of the fiber of the ultraviolet light-curable silicone composition, the silicone composition can be cured, yielding a cured silicone fiber. The ultraviolet light irradiation device is positioned so as to be able to irradiate the silicone composition with ultraviolet light during the drawing out. Examples of suitable ultraviolet light irradiation devices include ultraviolet lamps, and ultraviolet light emitting diodes. The ultraviolet light irradiation conditions can be selected appropriately in accordance with the fiber diameter, namely the diameter of the aforementioned aperture, and the extrusion speed of the ultraviolet light-curable silicone composition.

(The Case of an Ultraviolet Light-Curable Silicone Composition)

By passing the condensation-curable silicone composition through an atmosphere that contains moisture (for example, a humidity within a range from 25 to 90% RH, and preferably from 50 to 85% RH), during the drawing out of the fiber of the curable silicone composition, the composition can be cured, yielding a cured silicone fiber.

- <2> Production of Nonwoven Fabric-Type Non-Melting Solid Silicone

-- Production Method 2-1 (Dry Method Using a Meltable Silicone Resin)

A method of producing a non-melting silicone resin-based nonwoven fabric comprising melt spinning of a meltable silicone resin to form a meltable silicone resin fiber, subjecting the meltable silicone resin fiber to suction collection on a receiver to form a nonwoven fabric, and then subjecting the nonwoven fabric to a non-melting treatment.

According to this method, a nonwoven fabric in a form of felt is obtained.

In this production method, the step of forming the meltable silicone resin fiber from the meltable silicone resin is the same as the step within the production method 1-1 for producing a fibrous non-melting solid silicone. As was the case above, in this method, the melt spinning preferably uses a melt blow method.

By collecting the melt spun meltable silicone resin fiber on a receiver by applying suction, a nonwoven fabric of the fibers is formed. There are no particular restrictions on the direction in which the meltable silicone resin fiber is drawn from the fiber spinning nozzle, with vertical, diagonal or sideways drawing all being suitable, and the receiver that receives the drawn fiber is positioned so as to be able to suitable intercept and collect the fiber being spun in the direction of being drawn. In a typical arrangement, drawing is conducted in a vertical downward direction from the fiber spinning nozzle so that the fiber falls under the effects of gravity, and the receiver is positioned horizontally in a position directly below the fiber spinning nozzle. Regardless of positioning, suction is preferably conducted from behind the receiver. By conducting suction collection, the fibers become effectively intertwined, yielding a nonwoven fabric with excellent strength. The suction speed is preferably within a range from 2 to 10 m/s.

There are no particular restrictions on the shape of, or the material used for, the receiver, which are as described above in relation to the above production method 1-2. The height from the aforementioned aperture to the receiver varies depending on factors such as the temperature and humidity of the operating environment, and although there are no particular restrictions, is typically within a range from 20 to 150 cm. When executing the above method, the receiver is preferably moved continuously in a prescribed direction so that the nonwoven fabric is formed with a constant and uniform thickness on top of the receiver. In such cases, the travel speed of the receiver is typically within a range from 0.01 to 5 m/s, and is preferably from 0.05 to 2 m/s. An example of this type of moving receiver is the belt of a belt conveyor.

Suction collection of the curable silicone fiber on the surface of a receiver can be conducted by airflow or static electricity or the like, but is preferably conducted by airflow. In those cases where the suction collection is conducted by airflow, a material with favorable air permeability must be selected as the material for the receiver. The airflow is generated so as to flow from the upper surface of the receiver through to the rear surface, and this airflow is used to effect suction collection. In those cases where the suction collection is conducted by static electricity, a chargeable material is selected as the material for the receiver, and suitable materials include metals or plastics.

FIG. 1 is a schematic diagram showing an example of the production step for a silicone-based nonwoven fabric according to the above method. A melted silicone resin 2 is supplied via a fiber spinning nozzle 1, and is extruded from a nozzle aperture 3 and falls vertically downward. The number of fiber spinning nozzles 1 may be either one, or a plurality. In the case of a plurality of fiber spinning nozzles 1, a multitude of positional arrangements are possible for the nozzles, although the arrangement is preferably such that a uniform quantity of the silicone fiber falls onto a fixed region of the receiver. For example, the tips of the nozzles 1 may be arranged along a horizontal line, at the same height and with a uniform spacing between nozzles, or may be arranged in a two dimensional pattern within a horizontal plane. In the case of a two dimensional arrangement, the arrangement pattern may be a circle, a series of two or more concentric circles, or a radial pattern.

Upon exiting the nozzle 1, the falling melted silicone resin 2 cools and solidifies through exposure to the outside atmosphere, thereby forming a silicone resin fiber 4.

The silicone resin fiber 4 reaches the surface of a belt 5 of a belt conveyor. An arrow 7 indicates the travel direction of the belt 5. The belt 5 has a structure that exhibits air permeability, and is formed from a metal, plastic or rubber or the like. By applying suction from beneath the belt 5, an airflow is generated which passes through the belt 5 from top to bottom in the direction of an arrow 8. The silicone resin fiber 4 that reaches the surface of the belt 5 is collected on top of the belt 5 by the suction generated by the downward airflow. During this suction collection, the silicone resin fibers 4 become intertwined, so that a silicone-based nonwoven fabric 6 is formed continuously along the travel direction 7 of the belt 5.

-- Production Method 2-2 (Wet Method Using a Meltable Silicone Resin)

A method of producing a nonwoven fabric-type non-melting solid silicone melt spinning a meltable silicone resin to form a meltable silicone resin fiber, subjecting the meltable silicone resin fiber to a non-melting treatment to obtain a non-melting silicone resin fiber, dispersing the non-melting silicone resin fiber within an aqueous medium containing a binder to prepare a slurry, and then producing the non-melting silicone resin-based nonwoven fabric from the slurry using a papermaking process.

According to this method, a nonwoven fabric is obtained as a bonded fabric.

The formation of the meltable silicone resin fiber is the same as that described above in the production method 1-1, and the non-melting treatment is also conducted in the manner described above. The non-melting silicone resin fiber obtained in this manner is then added to an aqueous medium containing a binder, such as an aqueous solution containing water and a binder, thereby preparing a water-based slurry of the fiber. Examples of binders that can be used include organic binders such as carboxymethylcellulose and polyvinyl alcohol, and inorganic binders such as colloidal silica and colloidal alumina. The quantity of the binder is preferably as small as possible relative to the quantity of fiber, and specifically, is preferably not more than 3% by mass, typically within a range from 0.05 to 3% by mass, and even more preferably not more than 1% by mass, relative to the mass of fiber.

The concentration of the non-melting silicone resin fiber within the slurry is typically within a range from 0.1 to 50% by mass, and is preferably from 0.5 to 30% by mass.

The step of using a papermaking process to prepare a nonwoven fabric from the non-melting silicone resin fiber dispersed within the slurry may employ essentially the same techniques as those used during normal papermaking processes.

-- Production Method 2-3 (Dry Method Using a Curable Silicone Composition)

A method of producing a silicone nonwoven fabric comprising a cured silicone fiber by a process comprising curing a curable silicone composition while the composition is drawn out, to produce a cured silicone composition in the same manner as that described in the production method 1-2, and then subjecting the cured silicone fiber to suction collection on a receiver.

According to this method, a nonwoven fabric in a form of felt is obtained.

Suction collection of the cured silicone fiber on the receiver may be conducted in the same manner as that described in the production example 2-1, and in a similar manner to that described above, the receiver is preferably moved continuously.

Figure 2:
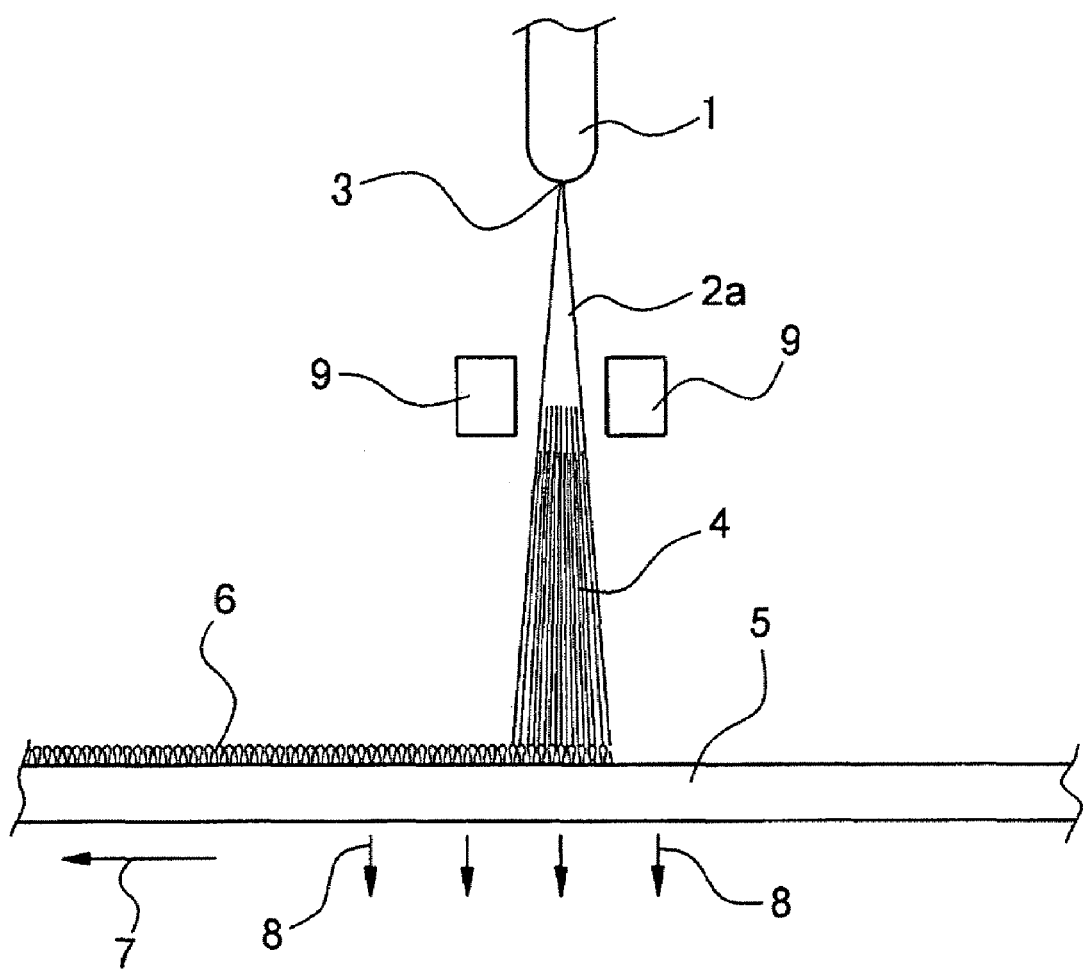
FIG. 2 is a schematic diagram describing a process for producing a silicone-based nonwoven fabric from a silicone curable composition using a dry method.

FIG. 2 is a schematic diagram showing the process for producing a silicone nonwoven fabric according to this production method. A curable silicone composition 2a supplied via a fiber spinning nozzle 1 is extruded from a nozzle aperture 3 and falls vertically downward. The number of fiber spinning nozzles 1 may be either one, or a plurality. In the case of a plurality of fiber spinning nozzles 1, a multitude of positional arrangements are possible for the nozzles, although the arrangement is preferably such that a uniform quantity of the silicone fiber falls onto a fixed region of the receiver. For example, the tips of the nozzles may be arranged along a horizontal line, at the same height and with a uniform spacing between nozzles, or may be arranged in a two dimensional pattern within a horizontal plane. In the case of a two dimensional arrangement, the arrangement pattern may be a circle, a series of two or more concentric circles, or a radial pattern.

An apparatus 9 for curing the composition, which is selected in accordance with the nature of the composition, is positioned close to the path along which the curable silicone composition 2a falls. In those cases where the curable silicone composition 2a is an addition-curable silicone composition, the apparatus 9 is a heating apparatus, and as the curable silicone composition 2a passes close to the apparatus 9 it is heated and cured, thereby forming a cured silicone fiber 4. In those cases where the curable silicone composition 2a is an ultraviolet light-curable silicone composition, the apparatus 9 is an ultraviolet light irradiation apparatus, and as the curable silicone composition 2a passes close to the apparatus 9 it is irradiated with ultraviolet light and cured, thereby forming a cured silicone fiber 4. In those cases where the curable silicone composition 2a is a condensation-curable silicone composition, the curable silicone composition 2a is cured by moisture contained within the atmosphere, thereby forming a cured silicone fiber 4, and consequently the apparatus 9 is unnecessary, although a heating apparatus may be provided as the apparatus 9 in order to accelerate the curing process.

The formed cured silicone fiber 4 reaches the surface of a belt 5 of a belt conveyor. An arrow 7 indicates the travel direction of the belt 5. The belt 5 is as the same as in FIG. 1; thus, an airflow is generated which passes downward. The cured silicone fiber 4 that reaches the surface of the belt 5 is collected on top of the belt 5. During this suction collection, the cured silicone fibers 4 become intertwined, so that a silicone nonwoven fabric 6 is formed continuously along the travel direction 7 of the belt 5.

In those cases where suction is not applied from beneath the belt 5, instead of a silicone nonwoven fabric 6 being formed, the cured silicone fiber 4 that reaches the surface of the belt 5 is collected in a cotton wool-like form on top of the belt 5. The cotton wool-like cured silicone fiber 4 collected in this manner can be used to produce a nonwoven fabric by a papermaking process that employs an aqueous dispersion produced from the cured silicone fiber 4 via a wet method.

-- Production Method 2-4 (Wet Method Using a Curable Silicone Composition)

A method of producing a silicone nonwoven fabric comprising a cured silicone fiber by a process comprising curing a curable silicone composition while the fiber of the composition is drawn out, to produce a cured silicone fiber in the same manner as that described in the production method 1-2, dispersing the cured silicone fiber in an aqueous medium containing a binder to obtain a slurry, and obtaining a silicone nonwoven fabric from the slurry using a papermaking process.

According to this method, a nonwoven fabric is obtained as a bonded fabric.

In the case of this method, with the exception of using the obtained cured silicone fiber instead of the non-melting silicone resin fiber, the slurry is obtained by dispersing the fiber in an aqueous medium containing a binder in the same manner as that described above in the production method 2-2, and a silicone nonwoven fabric is then produced from this slurry using a papermaking process.

- Heating within a Non-Oxidizing Atmosphere -

According to a method of producing an amorphous inorganic ceramic material of the present invention, the non-melting solid silicone obtained as described above is heated under a non-oxidizing atmosphere at a temperature within a range from 400 to 1,500° C. This heating temperature is preferably 600° C. or higher, and is most preferably 800° C. or higher. Furthermore, the heating temperature is preferably not more than 1,300° C., and even more preferably 1,100° C. or lower. In other words, the heating temperature is preferably within a range from 600 to 1,300° C., and even more preferably from 800 to 1,100° C. This heat treatment causes cleavage of carbon-hydrogen bonds that exist within the silicone, and dissociation of the hydrogen, which causes the a ceramicization. However, heat treatment at the above temperature causes almost no dissociation of the silicon and carbon that exist within the object being processed, and these elements are retained effectively within the product. If a group 8 metal element such as a platinum group metal like platinum, palladium or rhodium exists within the non-melting solid silicone, then the above reaction is accelerated. The quantity of this group 8 metal element is preferably within a range from 0.1 to 5,000 ppm, and is even more preferably from 10 to 1,000 ppm. The required quantity may be added to the non-melting solid silicone according to need. In the absence of a group 8 element, the above heat treatment is preferably conducted at a temperature of 600° C. or higher.

There are no particular restrictions on the non-oxidizing atmosphere, provided it is able to satisfactorily prevent oxidation of the non-melting solid silicone during heating, although an inert gas atmosphere is preferred. Examples of suitable inert gases include nitrogen gas, argon gas and helium gas, and from a practical perspective, nitrogen gas is preferred.

- Applications -

An amorphous inorganic ceramic material of the present invention can be used as a reinforcing material for a composite material comprising a metal material, a polymer material, or both types of material. The ceramic material is preferably used in either a fibrous form or in the form of a nonwoven fabric, as described above. Representative examples include composite materials comprising a metal material, and an inorganic fiber and/or an inorganic nonwoven fabric, and composite materials comprising a polymer material, and an inorganic fiber and/or an inorganic nonwoven fabric. Examples of suitable metal materials include light metals such as aluminum and titanium. Examples of suitable polymer materials include polyethylene, polypropylene, polyethylene terephthalate and silicone resins. A composite material of the present invention can be produced by mixing together a metal material and/or a polymer material, with an inorganic fiber and/or an inorganic nonwoven fabric of the present invention. Usually, the composite material adopts a structure in which the metal material and/or polymer material that functions as the base material forms a matrix, and the inorganic fiber and/or inorganic nonwoven fabric is then dispersed within this matrix. The quantity added of the ceramic material, relative to the combined mass of the composite material, is preferably within a range from 1 to 50% by mass, and is even more preferably from 10 to 30% by mass. Provided the quantity added falls within this range, the strength of the resulting composite material can be more readily ensured.

An inorganic nonwoven fabric of the present invention exhibits excellent heat resistance and strength, and can be used favorably as an exhaust gas filter material, and particularly as an exhaust gas filter material for removing suspended particulate matter, which can be used, for example, for the purification of exhaust gases discharged from large vehicles such as trucks and buses, railway cars such as diesel locomotives, industrial machines that use diesel engines such as construction machinery, agricultural machinery and ships and the like, as well as exhaust gases from factories and domestic fuel cells.

EXAMPLES

As follows is a more detailed description of the present invention using a series of examples and comparative examples, although the present invention is in no way limited by these examples. In these examples, molecular weight values are weight average molecular weights measured by GPC and referenced against polystyrene standards. Furthermore, the average elemental ratio of constitutional elements within a fiber is simply referred to as the "elemental ratio". Moreover, "Me" represents a methyl group, "i-Pr" represents an isopropyl group, and "Ph" represents a phenyl group. Experiments in the following examples were conducted at room temperature unless otherwise indicated.

Example 1

Figure 3:
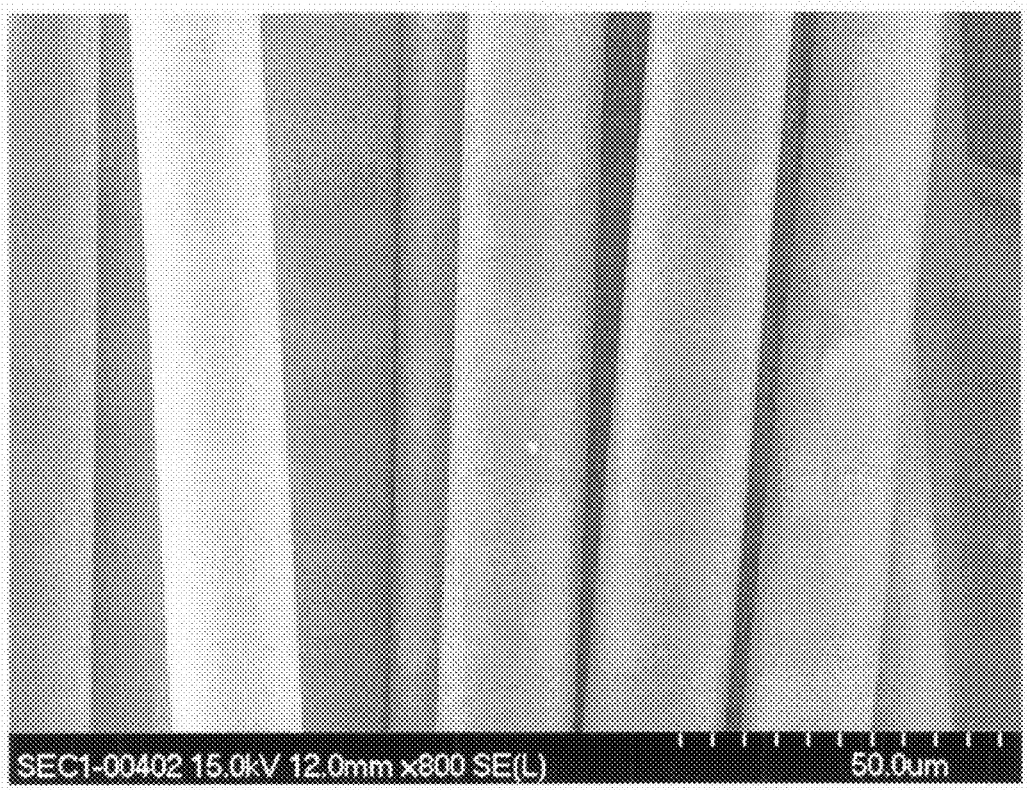
FIG. 3 is a SEM image (scale: 5 µm/division) of the silicone resin fiber obtained before heating in Example 1.

A meltable silicone resin comprising only $MeSiO_{3/2}$ units as the siloxane units, and containing 5% by mass of hydroxyl groups (molecular weight: 1,000, average compositional formula: $Me(OH)_{0.2}SiO_{1.3}$, elemental ratio: $SiCH_{3.2}O_{1.5}$, softening point: 65° C.) (hereinafter, referred to as "meltable silicone resin α") was subjected to melt spinning under an argon gas atmosphere at a temperature within a range from 130 to 140° C., using a monofilament spinning apparatus with an orifice diameter of 0.05 cm. The speed with which the fiber was wound onto the reel was 250 m/minute. In this manner, a silicone resin fiber with a diameter of approximately 20 μm was obtained. FIG. 3 shows a scanning electron microscope image (scale: 5 μm/division) of the silicone resin fiber obtained.

Figure 4:
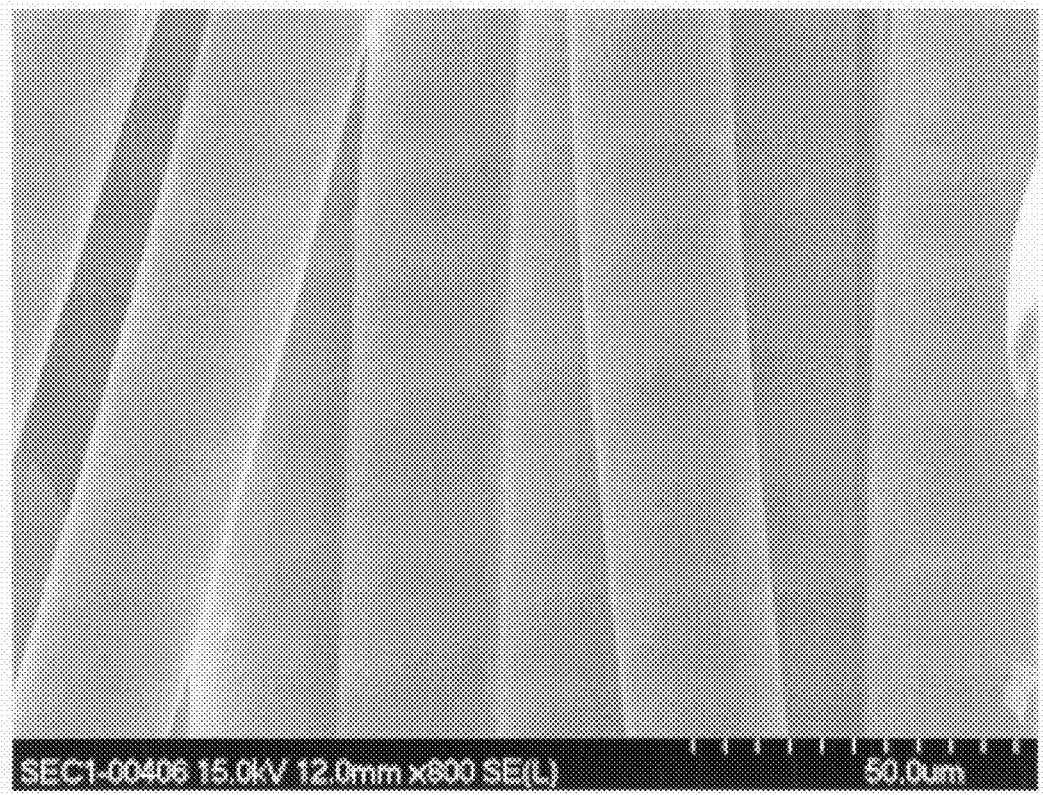
FIG. 4 is a SEM image (scale: 5 µm/division) of the black fiber obtained after heating in Example 1.

The thus obtained silicone resin fiber was immersed in a hydrochloric acid solution with a concentration of 20% by mass, and was left to stand for two days at room temperature. The fibers were then washed with water until the waste water reached a pH value of 6, and were subsequently dried by heating at a temperature of approximately 200° C. The fibers were then heated under a non-oxidizing atmosphere in the manner described below. Namely, the fibers were placed in an alumina boat, were subsequently heated under a nitrogen gas atmosphere inside a horizontal tubular furnace by raising the temperature from room temperature to 1,000° C. at a rate of temperature increase of 100° C./hour over an approximately 10-hour period, and were then held at 1,000° C. for a further one hour. Subsequently, the fibers were cooled to room temperature at a rate of 200° C./hour. This process yielded a black fiber. FIG. 4 shows a scanning electron microscope image (scale: 5 μm/division) of the black fiber obtained. Comparison of the mass of the fiber before and then after the heating process, and subsequent calculation of the proportion of mass lost as a result of the heating, relative to the mass prior to heating, revealed a result of 14.6%.

The microscope images show that shape or size of fiber has not substantially changed between before and after heating for ceramicization.

The SEM images taken before and after the ceramicization owing to the heat treatment show that the ceramicization did not cause any substantial changes in shape or size of the fiber.

Measurement of the elemental ratio of the black fiber using EDX analysis (energy dispersive X-ray analysis) from a FE-SEM (field emission scanning electron microscope) revealed a result of $SiC_{1.1}O_{1.7}$.

Furthermore, measurement of the hydrogen mass fraction relative to the total mass of fiber (hereafter referred to as simply "the hydrogen mass fraction") using FE-SEM EDX analysis revealed a result of 0.1% by mass or less.

Figure 5:
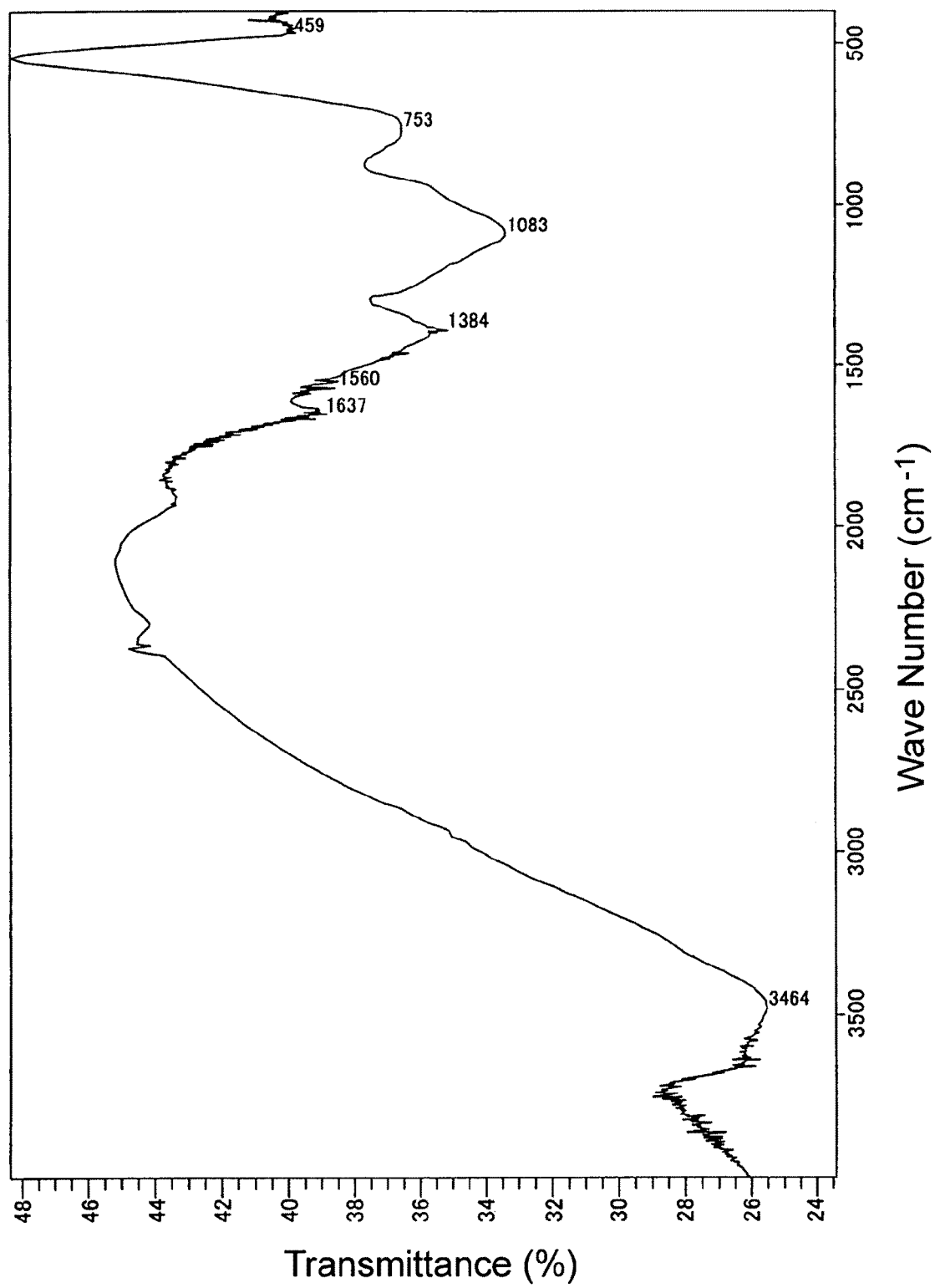
FIG. 5 is an infrared absorption spectrum obtained by FT-IR measurement of an inorganic fiber of the present invention obtained in an example 1.

Measurement of the above black fiber using a KBr disc method within a Fourier transform infrared spectrometer (FT-IR) (product name: Avatar 360, manufactured by Nicolet Japan Co., Ltd.) yielded the absorption spectrum shown in FIG. 5. An absorption derived from Si—O—Si bonds was observed at 1083 $cm^{-1}$, confirming the existence of a siloxane skeleton.

Figure 6:
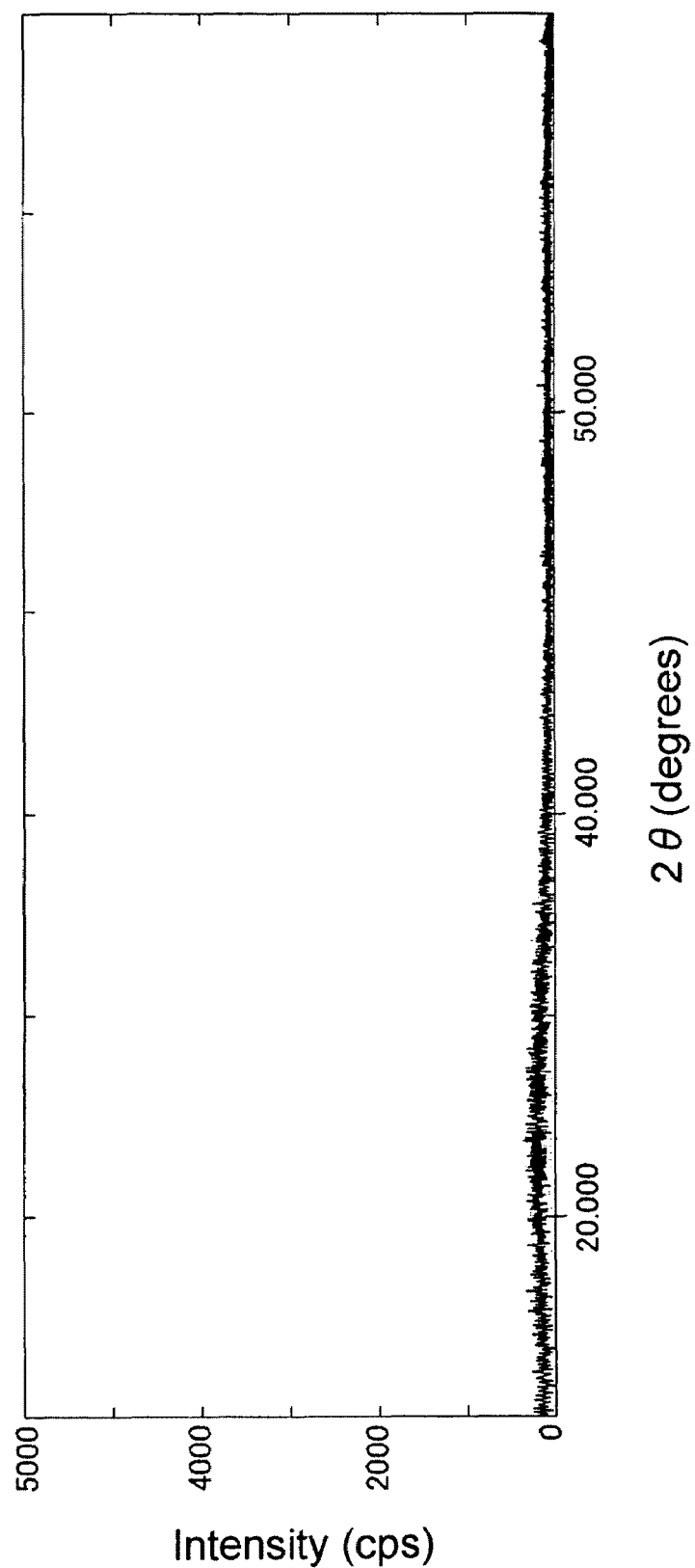
FIG. 6 is an X-ray diffraction spectrum of the inorganic fiber of the present invention obtained in the example 1.

Analysis of the above black fiber using an X-ray diffraction method yielded the X-ray diffraction spectrum shown in FIG. 6. As is evident from the diffraction spectrum, absolutely no diffraction peaks were observed, confirming that the fiber comprised an amorphous material.

Determination of the aspect ratio for the fiber (average diameter of fiber/average length of fiber) revealed a result of at least 2,000.

Example 2

With the exception of replacing the meltable silicone resin α used in the example 1 with a meltable silicone resin containing approximately 60 mol % of $MeSiO_{3/2}$ units and approximately 40 mol % of $i$-$PrSiO_{3/2}$ units as the siloxane units, and containing 5% by mass of hydroxyl groups (molecular weight: 1,000, average compositional formula: $(Me)_{0.6}(i\text{-}Pr)_{0.4}(OH)_{0.2}SiO_{1.3}$, elemental ratio: $SiC_{1.8}H_{4.8}O_{1.5}$, softening point: 75° C.) (hereinafter, referred to as "meltable silicone resin β"), a black fiber was obtained in the same manner as the example 1. The heating loss ratio was 17.8%, and the black fiber exhibited an elemental ratio of $SiC_{1.2}O_{1.7}$ and a hydrogen mass fraction of 0.1% by mass or less.

Determination of the aspect ratio for the fiber (average diameter of fiber/average length of fiber) revealed a result of at least 2,000.

Example 3

With the exceptions of replacing the meltable silicone resin used in the example 1 with a meltable silicone resin containing approximately 60 mol % of $PhSiO_{3/2}$ units, approximately 20 mol % of $Ph_2SiO$ units, and approximately 20 mol % of MeSiO$_{3/2}$ units as the siloxane units, and containing 5% by mass of hydroxyl groups (molecular weight: 1,000, average compositional formula: Ph(Me)$_{0.2}$(OH)$_{0.3}$SiO$_{1.1}$, elemental ratio:

SiC$_{6.2}$H$_{5.6}$O$_{1.4}$, softening point: 92° C.) (hereinafter, referred to as "meltable silicone resin γ"), and replacing the 20% by mass hydrochloric acid treatment with a 98% by mass sulfuric acid treatment, a black fiber was obtained in the same manner as the example 1. The heating loss ratio was 51.2%, and the black fiber exhibited an elemental ratio of SiC$_{1.4}$O$_{1.5}$ and a hydrogen mass fraction of 0.1% by mass or less.

Determination of the aspect ratio for the fiber (average diameter of fiber/average length of fiber) revealed a result of at least 2,000.

Comparative Example 1

With the exception of conducting the heating of the example 1 under an air atmosphere instead of under a nitrogen gas atmosphere, preparation was conducted in the same manner as the example 1, and yielded a white fiber. The heating loss ratio was 17.8%, and the elemental ratio of the white fiber was SiC$_{0.1}$O$_{1.7}$. This white fiber had an extremely low carbon content, and was extremely brittle. Furthermore, the aspect ratio for the fiber was very short, at approximately 10.

Example 4

- Dry Method -

(a) 90 parts by mass of a diorganopolysiloxane containing vinyl groups bonded to silicon atoms, represented by a formula shown below.

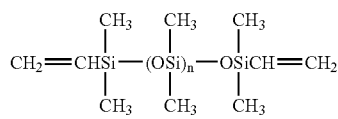

(wherein, n represents a number that yields a viscosity at 25° C. for the siloxane of 600 mPa·s)

(b) 10 parts by mass of a diorganopolysiloxane containing hydrogen atoms bonded to silicon atoms, represented by a formula shown below.

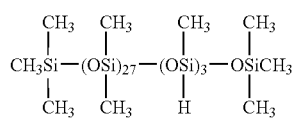

(c) 0.15 parts by mass of a toluene solution of a complex of platinum and divinyltetramethyldisiloxane (platinum element content: 0.5% by mass, a hydrosilylation catalyst)

The above components (a) and (b) were combined in a planetary mixer (a mixing device, manufactured by Inoue Manufacturing Co., Ltd.), and were stirred for one hour at room temperature. Subsequently, the component (c) was added to the planetary mixer and stirring was continued for a further 30 minutes, thus yielding an addition-curable silicone composition.

Using the technique shown in FIG. 2, a silicone nonwoven fabric was formed from this composition. 20 fiber spinning nozzles 1 (cross-sectional shape: circular, internal diameter: 500 µm) were arranged along a single line with a spacing of 1 mm between nozzles. A heating apparatus that functioned as the apparatus 9 was positioned across a range from 10 to 50 cm below the nozzle apertures 3. A horizontal separation of 50 mm was maintained between the falling composition 2a and the apparatus 9. The belt 5 of a belt conveyor was positioned horizontally at a location 100 cm below the nozzle apertures 3. The material used for forming the belt 5 was a rubber with a structure that exhibited air permeability. The belt 5 was moved in the direction of the arrow 7 at a travel speed of 2 cm/s. Suction was conducted from beneath the belt with a suction speed of 5 m/s, thereby forming an airflow which passed through the belt 5 from top to bottom in the direction of the arrow 8.

The above addition-curable silicone composition was extruded from the fiber spinning nozzles 1 under an argon gas atmosphere, at room temperature, and at a extrusion speed of 50 m/s, and subsequently fell downward. The falling composition was cured by heating to 180° C. by the apparatus 9, thereby forming a silicone fiber 4. The silicone fiber 4 was collected by suction on the surface of the belt 5, thereby intertwining the fibers, and forming a silicone-based nonwoven fabric 6 along the travel direction of the belt 5 in a continuous manner. Measurement of the fiber diameter of the silicone fiber within the thus formed nonwoven fabric using a SEM (scanning electron microscope) revealed a diameter of approximately 3 µm. The thickness of the nonwoven fabric was 1 mm.

This silicone nonwoven fabric was placed in an alumina boat, was subsequently heated under a nitrogen gas atmosphere inside an atmospheric electric furnace by raising the temperature from room temperature to 1,000° C. at a rate of temperature increase of 100° C./hour over an approximately 10-hour period, and was then held at 1,000° C. for a further one hour. Subsequently, the nonwoven fabric was cooled to room temperature at a rate of 200° C./hour. This process yielded a brow-colored nonwoven fabric. Calculation of the heating loss ratio revealed a result of 14.6%. Measurement of the fiber diameter of the silicone fiber within the nonwoven fabric using a SEM revealed a diameter of approximately 3 µm. The thickness of the nonwoven fabric was 1 mm. Measurement of the elemental ratio of the fiber within the brown-colored nonwoven fabric using EDX analysis (energy dispersive X-ray analysis) from a FE-SEM (field emission scanning electron microscope) revealed a result of SiC$_{1.3}$O$_{1.7}$. Furthermore, measurement of the hydrogen mass fraction relative to the total mass of fiber using FE-SEM EDX analysis revealed a result of 0.1% by mass or less.

This inorganic nonwoven fabric was exposed to air at 900° C. for 150 hours. Calculation of the heating loss ratio revealed a result of 1.2%, and inspection of the shape of the fabric before and after heating using a SEM revealed no changes.

Example 5

- Wet Method -

With the exception of not conducting the suction from beneath the belt 5, preparation was conducted in the same manner as the example 4, and instead of a silicone nonwoven fabric, yielded a silicone fiber 4 that was collected in a cotton wool-like form on top of the belt 5. Measurement of the fiber diameter of this fiber using a SEM revealed a result of approximately 3 µm. 10 parts by mass of this fiber was added to 100 parts by mass of a 1% by mass aqueous solution of carboxymethylcellulose, and the resulting mixture was shaken for 2 hours in a shaker operating at 100 back and forth movements/minute, thereby forming a slurry. Using a 200 mesh strainer (prescribed in JIS Z 8801-1), a silicone nonwoven fabric was produced from this slurry by a papermaking process. Measurement of the fiber diameter of the fiber within the resulting nonwoven fabric by SEM revealed a result of approximately 3 μm. The thickness of the nonwoven fabric was 0.8 mm.

This silicone nonwoven fabric was heated in the same manner as in the example 4, yielding a brown-colored nonwoven fabric. Calculation of the heating loss ratio revealed a result of 16.3%. Measurement of the fiber diameter of the silicone fiber within the resulting nonwoven fabric using a SEM revealed a diameter of approximately 3 μm. The thickness of the nonwoven fabric was 0.8 mm. Measurement of the elemental ratio of the fiber within the brown-colored nonwoven fabric in the same manner as that described in the example 4 revealed a result of $SiC_{1.4}O_{1.7}$. Furthermore, measurement of the hydrogen mass fraction in the same manner as in the example 4 revealed a result of 0.1% by mass or less.

This inorganic nonwoven fabric was exposed to air at 900° C. for 150 hours. Calculation of the heating loss ratio revealed a result of 1.4%, and inspection of the shape of the fabric before and after heating using a SEM revealed no changes.

Example 6

100 parts by mass of a liquid organopolysiloxane represented by a formula shown below:

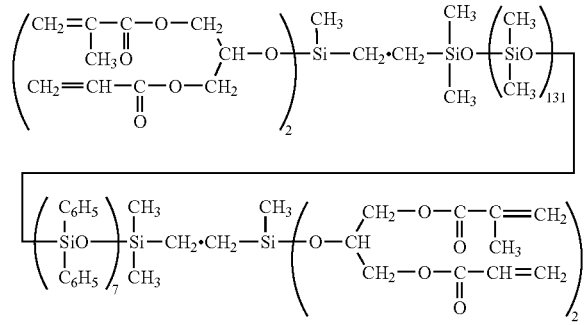

2 parts by mass of 2-hydroxy-2-methyl-1-phenylpropan-1-one, 1 part by mass of 2,4,6-trimethylbenzoyldiphenylphosphine oxide, 1 part by mass of a partial hydrolysis-condensation product of tetramethoxysilane (a methoxysiloxane oligomer), and 0.1 parts by mass of a titanium chelate compound represented by a formula shown below:

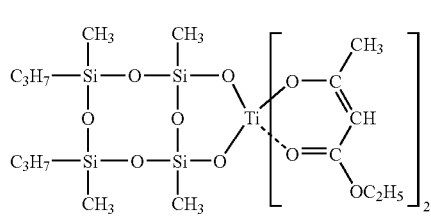

were mixed together, yielding an ultraviolet light-curable silicone composition.

Using the technique shown in FIG. 2, a silicone nonwoven fabric was formed from this composition. 20 fiber spinning nozzles 1 (cross-sectional shape: circular, internal diameter: 500 μm) were arranged along a single line with a spacing of 1 mm between nozzles. Two metal halide mercury lamps (80 W/cm², energy dose: 400 mJ/s) that functioned as the apparatus 9 were positioned across a range from 10 to 50 cm below the nozzle apertures 3. A horizontal separation of 50 mm was maintained between the falling composition 2a and the mercury lamps. The belt 5 of a belt conveyor was positioned horizontally at a location 100 cm below the nozzle apertures 3. In order to ensure that the belt 5 exhibited air permeability, a similar belt 5 to that used in the example 4 was used. The belt 5 was moved in the direction of the arrow 7 at a travel speed of 2 cm/s. Suction was conducted from beneath the belt with a suction speed of 5 m/s, thereby forming an airflow which passed through the belt 5 from top to bottom.

The above ultraviolet light-curable silicone composition was extruded from the fiber spinning nozzles 1 under an argon gas atmosphere, at room temperature, and at a extrude speed of 50 m/s, and subsequently fell downward. The falling composition was cured by irradiation with ultraviolet light from the mercury lamps, thereby forming a silicone fiber 4. The silicone fiber 4 was collected by suction on the surface of the belt 5, thereby intertwining the fibers, and forming a silicone-based nonwoven fabric 6 along the travel direction of the belt 5 in a continuous manner. Measurement of the fiber diameter of the silicone fiber within the thus formed nonwoven fabric using a SEM revealed a diameter of approximately 3 μm. The thickness of the nonwoven fabric was 1 mm.

This silicone nonwoven fabric was heated in the same manner as in the example 4, yielding a brown-colored nonwoven fabric. Calculation of the heating loss ratio revealed a result of 13.4%. Measurement of the fiber diameter of the silicone fiber within the resulting nonwoven fabric using a SEM revealed a diameter of approximately 3 μm. The thickness of the nonwoven fabric was 1 mm. Measurement of the elemental ratio of the fiber within the brown-colored nonwoven fabric in the same manner as that described in the example 4 revealed a result of $SiC_{1.2}O_{1.6}$. Furthermore, measurement of the hydrogen mass fraction in the same manner as in the example 4 revealed a result of 0.1% by mass or less.

This inorganic nonwoven fabric was exposed to air at 900° C. for 150 hours. Calculation of the heating loss ratio revealed a result of 1.0%, and inspection of the shape of the fabric before and after heating using a SEM revealed no changes.

Example 7

To 100 parts by mass of a dimethylpolysiloxane with both terminals blocked with trimethoxysiloxy groups, represented by a formula shown below:

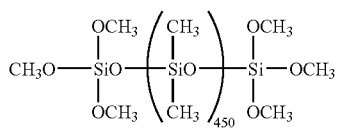

was added 0.1 parts by mass of a titanium chelate catalyst, and the resulting mixture was stirred thoroughly, yielding a condensation-curable silicone composition.

Using the technique shown in FIG. 2, a silicone nonwoven fabric was formed from this composition. 20 fiber spinning nozzles 1 (cross-sectional shape: circular, internal diameter: 500 μm) were arranged along a single line with a spacing of 1 mm between nozzles. A similar heating apparatus to that used in the example 4, which functioned as the apparatus 9, was positioned across a range from 10 to 50 cm below the nozzle apertures 3. A horizontal separation of 50 mm was maintained between the falling composition 2a and the apparatus 9. The belt 5 of a belt conveyor was positioned horizontally at a location 100 cm below the nozzle apertures 3. In order to ensure that the belt 5 exhibited air permeability, a similar belt 5 to that used in the example 4 was used. The belt 5 was moved in the direction of the arrow 7 at a travel speed of 2 cm/s. Suction was conducted from beneath the belt with a suction speed of 5 m/s, thereby forming an airflow which passed through the belt 5 from top to bottom.

The above condensation-curable silicone composition was extruded from the fiber spinning nozzles 1 under an argon gas atmosphere (50% RH), at room temperature, and at a extrusion speed of 50 m/s, and subsequently fell downward. The falling composition was cured by the moisture in the surrounding environment, thereby forming a silicone fiber 4. Furthermore, the composition was also heated to 180° C. by the apparatus 9, which further accelerated the curing process. The silicone fiber 4 was collected by suction on the surface of the belt 5, thereby intertwining the fibers, and forming a silicone-based nonwoven fabric 6 along the travel direction of the belt 5 in a continuous manner. Measurement of the fiber diameter of the silicone fiber within the thus formed nonwoven fabric using a SEM revealed a diameter of approximately 3 µm. The thickness of the nonwoven fabric was 1 mm.

This silicone nonwoven fabric was heated in the same manner as in the example 4, yielding a brown-colored nonwoven fabric. Calculation of the heating loss ratio revealed a result of 14.2%. Measurement of the fiber diameter of the silicone fiber within the resulting nonwoven fabric using a SEM revealed a diameter of approximately 3 µm. The thickness of the nonwoven fabric was 1 mm. Measurement of the elemental ratio of the fiber within the brown-colored nonwoven fabric in the same manner as that described in the example 4 revealed a result of $SiC_{1.3}O_{1.6}$. Furthermore, measurement of the hydrogen mass fraction in the same manner as in the example 4 revealed a result of 0.1% by mass or less.

This inorganic nonwoven fabric was exposed to air at 900° C. for 150 hours. Calculation of the heating loss ratio revealed a result of 1.1%, and inspection of the shape of the fabric before and after heating using a SEM revealed no changes.

Example 8

- Dry Method -

The method is described with reference to FIG. 1. Using a fiber spinning apparatus, a meltable silicone resin 2 which was the same meltable silicone resin a as used in Example 1, which had been melted at a temperature within a range from 130 to 140° C., was subjected to spinning using a melt blow method under an argon gas atmosphere, by discharging the resin at a speed of 50 m/s from an aperture 3 with a diameter of 500 µm belonging to a fiber spinning nozzle 1. The spun fiber 4 was collected on the belt 5 of a belt conveyor that was positioned below the nozzle 1 and functioned as a receiver, while the belt 5 was moved in the direction of an arrow 7 at a travel speed of 2 cm/s, and suction was conducted continuously from beneath the belt 5 with a suction speed of 5 m/s in the direction of an arrow 8. As a result, a silicone resin nonwoven fabric 6 was formed on top of the belt 5. Inspection of the fiber diameter of the nonwoven fabric using a SEM revealed that the fiber within the nonwoven fabric had a diameter of approximately 3 µm, whereas the thickness of the nonwoven fabric was 1 mm.

The thus obtained meltable silicone resin nonwoven fabric was immersed in a hydrochloric acid solution with a concentration of 20% by mass, and was left to stand for two days at room temperature. The fibers were then washed with water until the waste water reached a pH value of 6, and were subsequently dried by heating at a temperature of approximately 200° C., and inspection of the shape of the fibers within the fabric before and after heating using a SEM revealed no changes.

The meltable silicone resin nonwoven fabric was then heated under a non-oxidizing atmosphere in the manner described below. Namely, the fabric was placed in an alumina boat, was subsequently heated under a nitrogen gas atmosphere using an atmospheric electric furnace by raising the temperature from room temperature to 1,000° C. at a rate of temperature increase of 100° C./hour over an approximately 10-hour period, and was then held at 1,000° C. for a further one hour. Subsequently, the nonwoven fabric was cooled to room temperature at a rate of 200° C./hour. This process yielded a brown-colored inorganic nonwoven fabric.

- Heating Loss:

Comparison of the mass of the nonwoven fabric before and then after the above heating process, and subsequent calculation of the heating loss ratio revealed a result of 14.6%. The fiber diameter of the nonwoven fabric following heating was approximately 3 µm.

- Composition Elemental Analysis:

Measurement of the elemental ratio within the brown-colored inorganic nonwoven fabric using EDX analysis (energy dispersive X-ray analysis) from a FE-SEM (field emission scanning electron microscope) revealed a result of $SiC_{1.1}O_{1.7}$.

- Hydrogen Fraction:

Measurement of the hydrogen mass fraction within the inorganic nonwoven fabric (namely, the hydrogen mass fraction (% by mass) relative to the combined total of all the compositional elements) using FE-SEM EDX analysis revealed a result that was lower than the detection limit of 0.1% by mass.

- Evaluation of Heat Resistance:

This inorganic nonwoven fabric was exposed to air at 900° C. for 150 hours. Calculation of the mass loss ratio based on the measured mass values of the nonwoven fabric before and after heating revealed a result of 0.9%. Furthermore, inspection of the shape of the fibers within the nonwoven fabric before and after heating using a SEM revealed no changes.

Example 9

- Wet Method -

Using a fiber spinning apparatus, the same meltable silicone resin a (2 in FIG. 1) as that used in the example 8, which had been melted at a temperature within a range from 130 to 140° C., was subjected to spinning using a melt blow method under an argon gas atmosphere, by discharging the resin at a speed of 50 m/s from an aperture 3 with a diameter of 500 µm belonging to a fiber spinning nozzle 1. Because suction was not conducted from beneath the belt 5, a cotton wool-like meltable silicone resin fiber 4 was obtained on the belt 5. The diameter of the cotton wool-like fiber was approximately 3 µm.

10 parts by mass of this cotton wool-like fiber was added to 100 parts by mass of a 1% by mass aqueous solution of carboxymethylcellulose, and the resulting mixture was shaken for 2 hours in a shaker operating at 100 back and forth movements/minute, thereby forming a slurry. Using a 200 mesh strainer, a meltable silicone resin nonwoven fabric was produced from this slurry by a papermaking process. The thickness of the nonwoven fabric was 0.8 mm.

The thus obtained meltable silicone resin nonwoven fabric was subjected to a non-melting treatment and heat treatment in the same manner as the example 8, yielding a brown-colored inorganic nonwoven fabric. The diameter of the fiber within the nonwoven fabric was approximately 3 μm.

- Heating Loss:

Calculation of the heating loss ratio revealed a result of 14.2%.

- Composition Elemental Analysis:

Measurement of the elemental ratio within the brown-colored nonwoven fabric using EDX analysis (energy dispersive X-ray analysis) from a FE-SEM (field emission scanning electron microscope) revealed a result of $SiC_{1.1}O_{1.7}$. The diameter of the fiber within the nonwoven fabric at this point was approximately 3 μm.

- Evaluation of Heat Resistance:

This inorganic nonwoven fabric was exposed to air at 900° C. for 150 hours. Calculation of the heating loss ratio revealed a result of 1.1%, and inspection of the shape of the fibers before and after heating using a SEM revealed no changes.

Example 10

With the exceptions of replacing the meltable silicone resin a used in the example 8 with a meltable silicone resin γ as used in example 3, and replacing the 20% by mass hydrochloric acid treatment used in the non-melting treatment with a 98% by mass sulfuric acid treatment, a nonwoven fabric was obtained in the same manner as the example 8. Inspection of the fibers of the nonwoven fabric using a SEM revealed a fiber diameter within the nonwoven fabric of approximately 3 μm, and the thickness of the nonwoven fabric was 1 mm.

- Heating Loss:

Calculation of the heating loss ratio revealed a result of 51.2%.

- Composition Elemental Analysis:

Measurement of the elemental ratio within the brown-colored nonwoven fabric revealed a result of $SiC_{1.4}O_{1.5}$, and the hydrogen mass fraction was 0.1% by mass or less.

What is claimed is:

1. An amorphous inorganic ceramic material consisting of silicon, carbon, and oxygen or consisting of silicon, carbon, oxygen, and hydrogen, wherein an average elemental ratio between silicon, carbon, and oxygen is represented by a compositional formula (1) shown below:

$$SiC_aO_b \quad (1)$$

wherein, a is a number that satisfies: $0.5 \leq a \leq 3.0$, and b is a number that satisfies $0.5 \leq b \leq 4.0$, and the material has a siloxane skeleton formed of Si—O—Si bonds, and a hydrogen mass fraction is within a range from 0 to 1% by mass.

2. The amorphous inorganic ceramic material according to claim 1, wherein the material is fibrous.

3. The amorphous inorganic ceramic material according to claim 2, wherein the material is a fiber having an average diameter within a range from 0.1 to 50 μm.

4. The amorphous inorganic ceramic material according to claim 1, wherein the material is a nonwoven fabric.

5. The amorphous inorganic ceramic material according to claim 4, wherein the material is a nonwoven fabric formed of a fiber having an average diameter within a range from 0.1 to 50 μm.

6. A method of producing the amorphous inorganic ceramic material defined in claim 1, comprising heating a non-melting solid silicone under a non-oxidizing atmosphere at a temperature within a range from 400 to 1,5000° C.

7. The method of producing an amorphous inorganic ceramic material according to claim 6, wherein the non-melting solid silicone is a non-melting silicone resin obtained by subjecting a meltable silicone resin to a non-melting treatment.

8. The method of producing an amorphous inorganic ceramic material according to claim 7, wherein the meltable silicone resin is represented by an average composition formula (2) shown below:

$$R^1{}_mR^2{}_n(OR^3)_p(OH)_qSiO_{(4-m-n-p-q)/2} \quad (2)$$

(wherein, each $R^1$ represents, independently, a hydrogen atom or a monovalent hydrocarbon group other than an aryl group that includes or does not include a carbonyl group, $R^2$ represents a phenyl group, $R^3$ represents a monovalent hydrocarbon group of 1 to 4 carbon atoms, m represents a number that satisfies: $0.1 \leq m \leq 2$, n represents a number that satisfies: $0 \leq n \leq 2$, p represents a number that satisfies: $0 \leq p \leq 1.5$, and q represents a number that satisfies: $0 \leq q \leq 0.35$, provided that $p+q>0$ and $0.1 \leq m+n+p+q \leq 2.6$).

9. The method of producing an amorphous inorganic ceramic material according to claim 7, wherein the non-melting treatment of the meltable silicone resin is conducted by treating the meltable silicone resin with an inorganic acid.

10. The method of producing an amorphous inorganic ceramic material according to claim 6, wherein the non-melting solid silicone is a cured product of a curable silicone composition.

11. The method of producing an amorphous inorganic ceramic material according to claim 10, wherein the curable silicone composition is an addition-curable silicone composition.

12. The method of producing an amorphous inorganic ceramic material according to claim 10, wherein the curable silicone composition is a photocurable silicone composition.

13. The method of producing an amorphous inorganic ceramic material according to claim 10, wherein the curable silicone composition is a condensation-curable silicone composition.

14. The method of producing an amorphous inorganic ceramic material according to claim 6, wherein the non-melting solid silicone is in a fibrous form or is a nonwoven fabric, and the amorphous inorganic ceramic material is obtained in either a fibrous form or as a nonwoven fabric.

15. The method of producing an amorphous inorganic ceramic material according to claim 14, wherein the non-melting solid silicone is in a fibrous form, and the fibrous non-melting solid silicone is obtained by melt spinning a meltable silicone resin to obtain a meltable silicone resin fiber, and then subjecting the meltable silicone resin fiber to a non- melting treatment.

16. The method of producing an amorphous inorganic ceramic material according to claim 14, wherein the non-melting solid silicone is in a fibrous form, and the fibrous non-melting solid silicone is a cured silicone fiber obtained by continuously extruding a curable silicone composition which is liquid at room temperature through an aperture to form a fiber of the curable silicone composition, drawing out the fiber of the curable silicone composition, and curing the fiber of the curable silicone composition while the fiber is drawn out.

17. The method of producing an amorphous inorganic ceramic material according to claim 14, wherein the non-melting solid silicone is a nonwoven fabric, and the non-woven fabric-type non-melting solid silicone is obtained by a process comprising:

melt spinning a meltable silicone resin to form a silicone resin fiber, subjecting the silicone resin fiber to suction collection on a receiver to form a nonwoven fabric, and subjecting the nonwoven fabric to a non-melting treatment to produce said nonwoven fabric-type non-melting solid silicone.

18. The method of producing an amorphous inorganic ceramic material according to either claim 15, wherein the melt spinning of the meltable silicone resin is conducted using a melt blow method.

19. The method of producing an amorphous inorganic ceramic material according to either claim 17, wherein the melt spinning of the meltable silicone resin is conducted using a melt blow method.

20. The method of producing an amorphous inorganic ceramic material according to claim 14, wherein the non-melting solid silicone is a nonwoven fabric, and the non-woven fabric-type non-melting solid silicone is obtained by a process comprising:

melt spinning a meltable silicone resin to form a meltable silicone resin fiber, subjecting the silicone resin fiber to a non-melting treatment to obtain a non-melting silicone resin fiber, dispersing the non-melting silicone resin fiber within an aqueous medium containing a binder to prepare a slurry, and obtaining said nonwoven fabric-type non-melting silicone resin from the slurry using a papermaking process.

21. The method of producing an amorphous inorganic ceramic material according to claim 14, wherein the non-melting solid silicone is a nonwoven fabric, and the non-woven fabric-type non-melting solid silicone is obtained by a process comprising:

continuously extruding a curable silicone composition which is liquid at room temperature through an aperture to form a fiber of the curable silicone composition, drawing out the fiber of the curable silicone composition, curing the fiber of the curable silicone composition while the fiber is drawn out, to obtain a cured silicone fiber, and subjecting the cured silicone fiber to suction collection on a receiver to obtain said nonwoven fabric-type non-melting solid silicone.

22. The method of producing an amorphous inorganic ceramic material according to claim 14, wherein the non-melting solid silicone is a nonwoven fabric, and the non-woven fabric-type non-melting solid silicone is obtained by a process comprising:

continuously extruding a curable silicone composition which is liquid at room temperature through an aperture to form a fiber of the curable silicone composition, drawing out the fiber of the curable silicone composition, curing the fiber of the curable silicone composition while the fiber is drawn out, to obtain a cured silicone fiber, and dispersing the cured silicone fiber in an aqueous medium containing a binder to obtain a slurry, and obtaining a silicone nonwoven fabric from the slurry using a papermaking process.

23. A composite material, comprising either one of, or both, a metal material and a polymer material, together with the amorphous inorganic ceramic material defined in claim 1 as a reinforcing material.

24. An exhaust gas filter, comprising the nonwoven fabric-type amorphous inorganic ceramic material defined in claim 4.

* * * * *